(12) United States Patent
McMahon

(10) Patent No.: US 10,875,758 B2
(45) Date of Patent: Dec. 29, 2020

(54) DEVICES THAT CONTROL THE DISPENSING OF MATERIALS INTO RECEPTACLES, AND METHOD OF CONTROLLING DISPENSING

(71) Applicant: Marquardt GmbH, Rietheim-Weilheim (DE)

(72) Inventor: Stephen McMahon, Homer, NY (US)

(73) Assignee: Marquardt GmbH, Rietheim-Weilheim (DE)

(*) Notice: Subject to any disclaimer, the term of this patent is extended or adjusted under 35 U.S.C. 154(b) by 0 days.

(21) Appl. No.: 16/520,875

(22) Filed: Jul. 24, 2019

(65) Prior Publication Data

US 2020/0031655 A1 Jan. 30, 2020

Related U.S. Application Data

(60) Provisional application No. 62/703,144, filed on Jul. 25, 2018.

(51) Int. Cl.
*B67D 1/08* (2006.01)
*G01S 7/497* (2006.01)
*G01S 17/04* (2020.01)

(52) U.S. Cl.
CPC .......... *B67D 1/0888* (2013.01); *B67D 1/0878* (2013.01); *G01S 7/497* (2013.01); *G01S 17/04* (2020.01)

(58) Field of Classification Search
CPC ...... B67D 1/0888; B67D 1/0878; G01S 17/04; G01S 7/497; G01S 17/08; G01S 17/88
See application file for complete search history.

(56) References Cited

U.S. PATENT DOCUMENTS

| | | | |
|---|---|---|---|
| 6,082,419 A * | 7/2000 | Skell | B67D 1/1238 141/198 |
| 8,028,728 B2 | 10/2011 | Cooper | |
| 2007/0267098 A1 * | 11/2007 | Ozanne | B67D 1/1238 141/198 |
| 2017/0057804 A1 | 3/2017 | Chase et al. | |

* cited by examiner

*Primary Examiner* — Craig M Schneider
*Assistant Examiner* — Jason K Niesz
(74) *Attorney, Agent, or Firm* — Burr & Brown, PLLC

(57) ABSTRACT

A dispenser control device, comprising: at least a first light emitter and at least a first light detector, a memory component, a calculation component and a signal transmitter. The dispenser control device configured to conduct one or more of (1) calibration, (2) receptacle-type conjecturing, (3) stopping-intensity value determination, (4) receptacle filling status assessment, and (5) dispensing-termination signal transmission. Also methods comprising one or more of (1) calibration, (2) receptacle-type conjecturing, (3) stopping-intensity value determination, (4) receptacle filling status assessment, and (5) dispensing-termination signal transmission.

30 Claims, 2 Drawing Sheets

Figure 1:
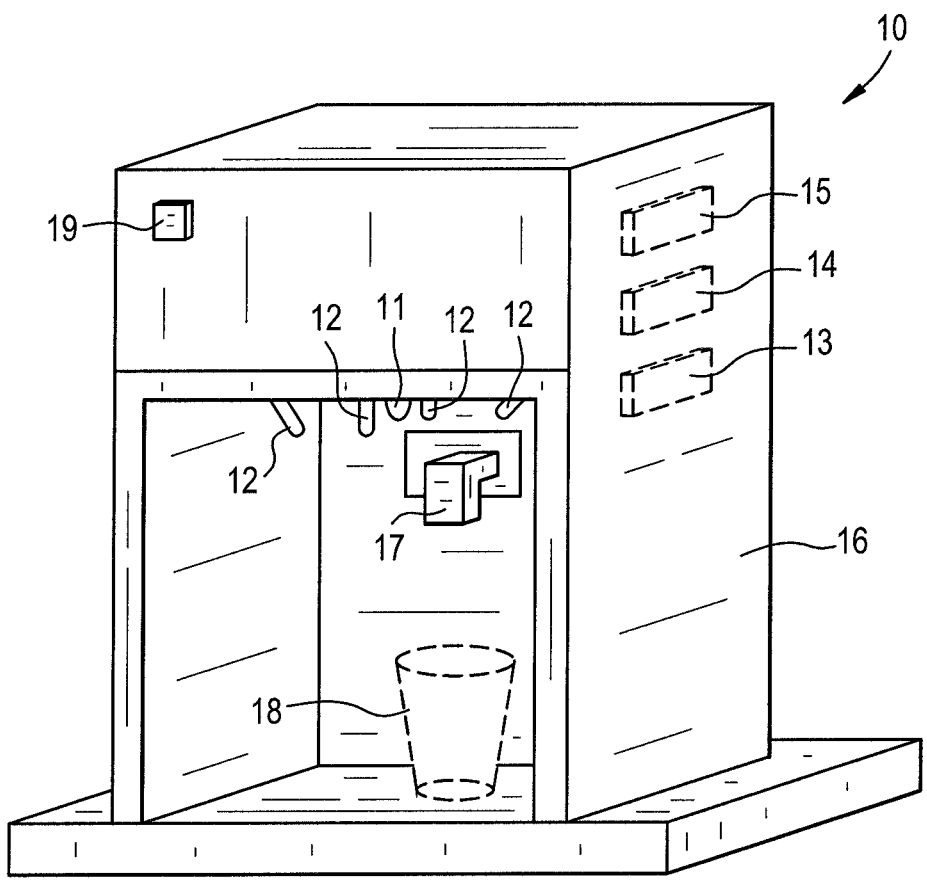

DEVICES THAT CONTROL THE DISPENSING OF MATERIALS INTO RECEPTACLES, AND METHOD OF CONTROLLING DISPENSING

FIELD OF THE INVENTIVE SUBJECT MATTER

The present inventive subject matter relates to devices that control the dispensing of material into receptacles (e.g., a cup, a tank, a bowl, etc.), and to methods of controlling dispensing of material into receptacles. Some aspects of the present inventive subject matter relate to devices that carry out activities that generate information that the device uses: to make conjectures as to features of a receptacle into which material is being dispensed (e.g., the shape and size of the receptacle), to make conjectures as to a value of a parameter that is indicative of the receptacle being sufficiently full of material (or filled to a desired degree), to make a conjecture as to the extent to which the receptacle is filled, to determine whether the value of the parameter has reached a value that is indicative of the receptacle being sufficiently full of material (or filled to a desired degree), and/or to perform calibration to enhance reliability of such conjectures, and/or devices that cause dispensing material into the receptacle to terminate upon determining that a parameter has reached a value that is indicative of a desired extent of filling having been reached (based on the conjecture(s), and to combinations of any two or more of such aspects. The present inventive subject matter also relates to any corresponding methods, e.g., methods that comprise carrying out activities that generate information, and/or making any of such conjectures, and/or performing such calibration, and/or terminating dispensing material into a receptacle upon the value(s) one or more parameters reaching certain value(s).

BACKGROUND

There are many situations where material is being dispensed into a receptacle and it is desirable for dispensing of the material to be automatically stopped before the receptacle is overflowing or too full (e.g., before it overflows and before it reaches a point where it is difficult to move the receptacle without spilling material), but not stopped earlier than desirable (e.g., not stopped when the receptacle is only half full). There are also many situations where material is being dispensed into a receptacle and it is desirable for dispensing of the material to be automatically stopped at a specific point (i.e., not necessarily nearly full, e.g., half-full, 30 percent full, etc.).

There exist a number of dispenser control devices (i.e., devices that control dispensing of material into receptacles), but there is an ongoing need for dispenser control devices and methods that are improved in one or more aspects. A need exists for reliable dispensing of fluid into various types of containers, beverage and otherwise. A need exists for dispenser control devices and dispensing methods that are reliable for many container materials, sizes, and shapes, and that are effective (or can compensate) for fluids of differing viscosity, temperature and color.

BRIEF SUMMARY OF THE INVENTIVE SUBJECT MATTER

Some aspects of the present inventive subject matter involve a dispenser initiating dispensing material into a receptacle (e.g., by an operator pressing a button to begin filling the receptacle, by the dispenser detecting a receptacle in a particular location, etc.). In some aspects of the present inventive subject matter, as the receptacle is filling: changing intensity of light (IR light and/or visible light) directed at the receptacle and detected by one or more light detectors aimed at the receptacle) is continuously monitored, and at a specific time after dispensing has started, the intensity value is entered into a calculation; the slope of the change in intensity is calculated; the slope is used to determine the final intensity (i.e., an intensity at which dispensing is to be terminated); and upon the light detector(s) outputting the value determined to be the final intensity, the dispensing is halted.

Some aspects of the present inventive subject matter involve calibrating a dispenser control device, and some aspects of the present inventive subject matter involve a dispenser control device that is configured to calibrate. Some aspects of the present inventive subject matter involve conjecturing as to features of a receptacle in a material-receiving location (e.g., the shape and size of the receptacle), and some aspects of the present inventive subject matter involve a dispenser control device that is configured to conjecture as to features of a receptacle in a material-receiving location. Some aspects of the present inventive subject matter involve determining a light (IR light and/or visible light) reflection intensity value at which dispensing should be terminated, and some aspects of the present inventive subject matter involve a dispenser control device that is configured to determine a light (IR light and/or visible light) reflection intensity value at which dispensing should be terminated. Some aspects of the present inventive subject matter involve assessing the status of filling a receptacle, and some aspects of the present inventive subject matter involve a dispenser control device that is configured to assess the status of filling a receptacle. Some aspects of the present inventive subject matter involve terminating dispensing when the dispenser control device senses that a light (IR light and/or visible light) reflection intensity value at which dispensing should be terminated is reached or has been reached, and some aspects of the present inventive subject matter involve a dispenser control device that is configured to terminate dispensing when the dispenser control device senses that a light (IR light and/or visible light) reflection intensity value at which dispensing should be terminated is reached or has been reached. Other aspects of the present inventive subject matter involve any combinations of such activities and/or any combinations of such characteristics in a device.

In some aspects of the present inventive subject matter, calibrating a dispenser control device, conjecturing as to the type of receptacle in a material-receiving location, determining a light reflection intensity value at which dispensing should be terminated, and determining that a light reflection intensity value has been reached at which dispensing should be terminated are carried out by respective sequences that comprise directing light (infrared radiation (IR light) and/or visible light) toward a receptacle and detecting the intensity of reflected light (e.g., reflected at least in part by the material in the receptacle and/or by the receptacle).

In carrying out some of the different sequences as described herein, there is a need (at various points in the different sequences) to determine an "aggregate reflected light intensity value" for a light detector. In some aspects of the present inventive subject matter, an aggregate reflected light intensity value for a light detector (for a specific quantity of light (IR light and/or visible light) pulses, each light pulse of a specific light emission intensity) is determined by a sequence that comprises:

(i) emitting from one or more light emitters the specific quantity of light pulses as a series of pulses of light (IR light and/or visible light), each light pulse of the specific light emission intensity (or substantially of such intensity, i.e., between 90 percent and 110 percent of such intensity);

(ii) detecting (in the light detector, or in each of a plurality of light detectors) an intensity of reflected light of each pulse in the series of light pulses; and (iii) summing the respective intensities of reflected light detected by the light detector (or by each of the light detectors) to determine the aggregate reflected light intensity value for the light detector (or respective aggregate reflected light intensity values for the light detectors).

In carrying out some of the different sequences as described herein, there is a need (at various points in the different sequences) to determine a "combined reflected light intensity value." In some aspects of the present inventive subject matter, a combined reflected light intensity value (for a dispenser control device that comprises one or more light detectors) is determined by a sequence that comprises:

determining an aggregate reflected light intensity value (as noted above, for a specific quantity of pulses of IR light and/or visible light), each light pulse of a specific light emission intensity) for each light detector (e.g., each at a particular respective moment, the respective moments being close in time, and in some cases very close in time, e.g., within 0.5 second, and in some cases less, in some cases much less); and summing the respective aggregate reflected light intensity values for each light detector to determine a combined reflected light intensity value for each light detector. In instances where there is only a single light detector, there is only a single aggregate reflected light intensity value, and for consistency in the terminology, summing "the respective aggregate reflected light intensity values" results in the combined reflected light intensity value being equal to the single aggregate reflected light intensity value (i.e., in such a case, "combined" means the sum of "all" of the aggregate reflected light intensity values, which renders in such cases just the value of the single aggregate reflected light intensity value).

The present inventive subject matter is directed to the use of IR light and/or visible light. Accordingly, the expression "light," as used herein, refers to IR light and/or visible light. Thus "light" refers to IR light alone, visible light alone, or a combination of IR light and visible light.

In some aspects of the present inventive subject matter, a dispenser control device that comprises one or more light emitters and one or more light detectors is configured to calibrate by a sequence of activities comprising:

(a) setting a light pulse quantity at an initial light pulse quantity; then (b) repeating a calibration sequence comprising:

(i) emitting a series of pulses of light from at least a first light emitter, the series of pulses of light consisting of a quantity of pulses equal to the light pulse quantity, each of the series of pulses of a first light emission intensity (or of substantially the first light emission intensity);

(ii) determining an aggregate reflected light intensity value for each light detector (or for the light detector);

(iii) comparing each of the aggregate reflected light intensity values (or the aggregate reflected light intensity value, in instances where the dispenser control device comprises only a single light detector) with a maximum calibration aggregate reflected light intensity value; and then (iv) if each of the aggregate reflected light intensity values is less than the maximum calibration aggregate reflected light intensity value, increasing the light pulse quantity by a light pulse calibration increase value, until the aggregate reflected light intensity value for at least one of the light detectors (or for the light detector) equals or exceeds the maximum calibration aggregate reflected light intensity value; and then (c) decreasing the light pulse quantity by a light pulse calibration decrease value to arrive at a calibrated light pulse quantity.

In some aspects of the present inventive subject matter, a method comprises such a sequence of activities.

In some aspects of the present inventive subject matter, a dispenser control device is configured to conjecture a receptacle type by activities comprising:

(a) setting a light pulse quantity at a calibrated light pulse quantity;

(b) dispensing material into a receptacle;

(c) emitting a series of pulses of light from at least a first light emitter, the series of pulses of light consisting of a quantity of pulses equal to the calibrated light pulse quantity, each of the series of pulses of a first light emission intensity (or of substantially the first light emission intensity);

(d) determining an aggregate reflected light intensity value for each light detector (in a dispenser control device that comprises one or more light detectors) at a first moment (or substantially at the first moment);

(e) summing the respective aggregate reflected light intensity values for the light detector(s) at or substantially at the first moment to determine a combined reflected light intensity value at the first moment (as noted above, if a dispenser control device includes only one light detector, there is only a single aggregate reflected light intensity value for the first moment, and thus the combined reflected light intensity value is equal to the aggregate reflected light intensity value for the one light detector);

(f) determining an aggregate reflected light intensity value for each light detector at a second moment (or substantially at the second moment), the second moment a first time span after the first moment;

(g) summing the respective aggregate reflected light intensity values for the light detector(s) at or substantially at the second moment to determine a combined reflected light intensity value at the second moment (as above, where a dispenser control device includes only one light detector, there is only a single aggregate reflected light intensity value at the second moment, and thus the combined reflected light intensity value is equal to the aggregate reflected light intensity value for the one light detector);

(h) calculating a combined reflected light intensity slope of change, the combined reflected light intensity slope of change equal to:

(the combined reflected light intensity value at the second moment minus the combined reflected light intensity value at the first moment) divided by the first time span; then (i) comparing the combined reflected light intensity slope of change with stored slope of reflected light change values (for a corresponding type of light, i.e., IR, visible or a mixture) for respective receptacle types; and then (j) based on said comparing, selecting a conjectured receptacle type, the conjectured receptacle type being one of the receptacle types, and in some aspects of the present inventive subject matter, a method comprises such activities.

In some aspects of the present inventive subject matter, a dispenser control device is configured to determine a light reflection intensity value (for the type of light being used) at which dispensing should be terminated ("stopping-intensity value"), said light reflection intensity value at which dispensing should be terminated equal to a combined reflected light intensity value at a first moment divided by a receptacle constant, the receptacle constant equal to a stored value for a conjectured receptacle type, and in some aspects of the present inventive subject matter, a method comprises such determining a light reflection intensity value at which dispensing should be terminated.

In some aspects of the present inventive subject matter, a dispenser control device is configured to assess the status of filling a receptacle by activities comprising:

repeating an aggregate light intensity value comparison sequence comprising:
    for each of at least one light emitter, the light emitter emitting a status-assessment series of light pulses, each of said status-assessment series of light pulses substantially of a first light emission intensity, the status-assessment series of light pulses consisting of a quantity of light pulses equal to a calibrated light pulse quantity;
    for each of at least one light detector:
        the light detector detecting an intensity of reflected light of each light pulse in the status-assessment series of light pulses;
        summing the respective intensities of reflected light of each light pulse in the status-assessment series of light pulses to determine a status-assessment aggregate reflected light intensity value;
    summing the respective status-assessment aggregate reflected light intensity value(s) to determine a status-assessment combined reflected light intensity value;
    comparing the status-assessment combined reflected light intensity value with a light reflection intensity value at which dispensing should be terminated; and then
    if the status-assessment combined reflected light intensity value is greater than said light reflection intensity value at which dispensing should be terminated, waiting a status-assessment interval,
until the status-assessment combined reflected light intensity value is less than or equal to said light reflection intensity value at which dispensing should be terminated, and in some aspects of the present inventive subject matter, a method comprises assessing the status of filling a receptacle by such activities.

In some aspects of the present inventive subject matter, a dispenser control device is configured to:
    dispense material and determine combined reflected light intensity values at regular intervals, until:
    a status-assessment combined reflected light intensity value is less than or equal to a light reflection intensity value at which dispensing should be terminated, at which time, dispensing is terminated (in some of such aspects of the present inventive subject matter, a dispensing-termination signal is generated, the dispensing-termination signal instructing the dispenser to terminate dispensing material into a receptacle), and in some aspects of the present inventive subject matter, a method comprises such activities.

As noted above, some aspects of the present inventive subject matter involve calibrating a dispenser control device; some aspects of the present inventive subject matter involve a dispenser control device that is configured to calibrate; some aspects of the present inventive subject matter involve conjecturing as to features of a receptacle in a material-receiving location; some aspects of the present inventive subject matter involve a dispenser control device that is configured to conjecture as to features of a receptacle in a material-receiving location; some aspects of the present inventive subject matter involve determining a light reflection intensity value at which dispensing should be terminated; some aspects of the present inventive subject matter involve a dispenser control device that is configured to determine a light reflection intensity value at which dispensing should be terminated; some aspects of the present inventive subject matter involve assessing the status of filling a receptacle; some aspects of the present inventive subject matter involve a dispenser control device that is configured to assess the status of filling a receptacle; some aspects of the present inventive subject matter involve terminating dispensing when the dispenser control device senses that a light reflection intensity value at which dispensing should be terminated is reached or has been reached; some aspects of the present inventive subject matter involve a dispenser control device that is configured to terminate dispensing when the dispenser control device senses that a light reflection intensity value at which dispensing should be terminated is reached or has been reached; and other aspects of the present inventive subject matter involve any combinations of such activities and/or any combinations of such characteristics in a device. With respect to such combinations of such activities and/or combinations of characteristics in a device, aspects of the present inventive subject matter include:

a dispenser control device:
    that is configured to calibrate as described above; and
    that is configured to conjecture as to features of a receptacle in a material-receiving location as described above;
a dispenser control device:
    that is configured to calibrate as described above;
    that is configured to conjecture as to features of a receptacle in a material-receiving location as described above; and
    that is configured to determine a light reflection intensity value at which dispensing should be terminated as described above;
a dispenser control device:
    that is configured to calibrate as described above;
    that is configured to conjecture as to features of a receptacle in a material-receiving location as described above;
    that is configured to determine a light reflection intensity value at which dispensing should be terminated as described above; and
    that is configured to assess receptacle filling status as described above;
a dispenser control device:
    that is configured to calibrate as described above;
    that is configured to conjecture as to features of a receptacle in a material-receiving location as described above;

that is configured to determine a light reflection intensity value at which dispensing should be terminated as described above;

that is configured to assess receptacle filling status as described above; and that is configured to terminate dispensing when the dispenser control device senses that a light reflection intensity value at which dispensing should be terminated is reached or has been reached as described above;

a dispenser control device:

that is configured to calibrate as described above; and that is configured to determine a light reflection intensity value at which dispensing should be terminated as described above;

a dispenser control device:

that is configured to calibrate as described above;

that is configured to determine a light reflection intensity value at which dispensing should be terminated as described above; and that is configured to assess receptacle filling status as described above a dispenser control device:

that is configured to calibrate as described above; and that is configured to assess receptacle filling status as described above;

a dispenser control device:

that is configured to conjecture as to features of a receptacle in a material-receiving location as described above; and that is configured to determine a light reflection intensity value at which dispensing should be terminated as described above;

a dispenser control device:

that is configured to conjecture as to features of a receptacle in a material-receiving location as described above;

that is configured to determine a light reflection intensity value at which dispensing should be terminated as described above; and that is configured to assess receptacle filling status as described above;

a dispenser control device:

that is configured to conjecture as to features of a receptacle in a material-receiving location as described above;

that is configured to determine a light reflection intensity value at which dispensing should be terminated as described above;

that is configured to assess receptacle filling status as described above; and that is configured to terminate dispensing when the dispenser control device senses that a light reflection intensity value at which dispensing should be terminated is reached or has been reached as described above;

a dispenser control device:

that is configured to determine a light reflection intensity value at which dispensing should be terminated as described above; and that is configured to assess receptacle filling status as described above;

a dispenser control device:

that is configured to determine a light reflection intensity value at which dispensing should be terminated as described above;

that is configured to assess receptacle filling status as described above; and that is configured to terminate dispensing when the dispenser control device senses that a light reflection intensity value at which dispensing should be terminated is reached or has been reached as described above;

a dispenser control device:

that is configured to assess receptacle filling status as described above; and that is configured to terminate dispensing when the dispenser control device senses that a light reflection intensity value at which dispensing should be terminated is reached or has been reached as described above;

a method that comprises:

calibrating a dispenser control device as described above; and conjecturing as to features of a receptacle in a material-receiving location as described above;

a method that comprises:

calibrating a dispenser control device as described above;

conjecturing as to features of a receptacle in a material-receiving location as described above; and determining a light reflection intensity value at which dispensing should be terminated as described above;

a method that comprises:

calibrating a dispenser control device as described above;

conjecturing as to features of a receptacle in a material-receiving location as described above;

determining a light reflection intensity value at which dispensing should be terminated as described above; and assessing receptacle filling status as described above;

a method that comprises:

calibrating a dispenser control device as described above;

conjecturing as to features of a receptacle in a material-receiving location as described above;

determining a light reflection intensity value at which dispensing should be terminated as described above;

assessing receptacle filling status as described above; and terminating dispensing when the dispenser control device senses that a light reflection intensity value at which dispensing should be terminated is reached or has been reached as described above;

a method that comprises:

calibrating a dispenser control device as described above; and determining a light reflection intensity value at which dispensing should be terminated as described above;

a method that comprises:

calibrating a dispenser control device as described above;

determining a light reflection intensity value at which dispensing should be terminated as described above; and assessing receptacle filling status as described above;

a method that comprises:

calibrating a dispenser control device as described above; and assessing receptacle filling status as described above;

a method that comprises:

conjecturing as to features of a receptacle in a material-receiving location as described above; and determining a light reflection intensity value at which dispensing should be terminated as described above;

a method that comprises:

conjecturing as to features of a receptacle in a material-receiving location as described above;

determining a light reflection intensity value at which dispensing should be terminated as described above; and assessing receptacle filling status as described above;

a method that comprises:

conjecturing as to features of a receptacle in a material-receiving location as described above;

determining a light reflection intensity value at which dispensing should be terminated as described above;
assessing receptacle filling status as described above; and
terminating dispensing when the dispenser control device senses that a light reflection intensity value at which dispensing should be terminated is reached or has been reached as described above;

a method that comprises:
determining a light reflection intensity value at which dispensing should be terminated as described above; and
assessing receptacle filling status as described above;

a method that comprises:
determining a light reflection intensity value at which dispensing should be terminated as described above;
assessing receptacle filling status as described above; and
terminating dispensing when the dispenser control device senses that a light reflection intensity value at which dispensing should be terminated is reached or has been reached as described above; and a method that comprises:
assessing receptacle filling status as described above; and
terminating dispensing when the dispenser control device senses that a light reflection intensity value at which dispensing should be terminated is reached or has been reached as described above.

As noted above, in some aspects of the present inventive subject matter, one or more of (1) calibrating a dispenser control device, (2) conjecturing as to the type of receptacle in a material-receiving location, (3) determining a light reflection intensity value at which dispensing should be terminated, and (4) assessing a receptacle filling status (e.g., determining whether a light reflection intensity value has been reached at which dispensing should be terminated) are carried out by respective sequences that comprise directing IR light and/or visible light toward a receptacle and detecting the intensity of reflected IR light and/or visible light. In some of such aspects, one or more of such (1) calibrating a dispenser control device, (2) conjecturing as to the type of receptacle in a material-receiving location, (3) determining a light reflection intensity value at which dispensing should be terminated, and (4) assessing a receptacle filling status is/are carried out using IR light. In some of such aspects, actions directed toward calibrating a dispenser control device are carried out using IR light, e.g., actions are performed that comprise:

(a) setting an IR light pulse quantity at an initial IR light pulse quantity; then
(b) repeating a calibration sequence comprising:
  (i) emitting a series of pulses of IR light from at least a first IR light emitter, the series of pulses of IR light consisting of a quantity of IR light pulses equal to the IR light pulse quantity, each of the series of pulses of a first IR light emission intensity (or of substantially the first IR light emission intensity);
  (ii) determining an aggregate reflected IR light intensity value for each IR light detector (or for the IR light detector);
  (iii) comparing each of the aggregate reflected IR light intensity values (or the aggregate reflected light IR intensity value, in instances where the dispenser control device comprises only a single IR light detector) with a maximum calibration aggregate reflected IR light intensity value; and then
  (iv) if each of the aggregate reflected IR light intensity values is less than the maximum calibration aggregate reflected IR light intensity value, increasing the IR light pulse quantity by an IR light pulse calibration increase value, and if the IR light pulse quantity reaches a maximum number of IR light pulses and the aggregate reflected IR light intensity value for each of the IR light detectors remains less than the maximum calibration aggregate reflected IR light intensity value, subsequent actions, comprising one or more of (1) calibrating the dispenser control device, (2) conjecturing as to the type of receptacle in a material-receiving location, (3) determining a light reflection intensity value at which dispensing should be terminated, and (4) assessing a receptacle filling status, is/are conducted using visible light instead of IR light.

The inventive subject matter may be more fully understood with reference to the accompanying drawings and the following detailed description of the inventive subject matter.

BRIEF DESCRIPTION OF THE DRAWING FIGURES

FIG. 1 schematically depicts a representative embodiment of a dispenser control device 10 in accordance with the present inventive subject matter.

Figure 2:
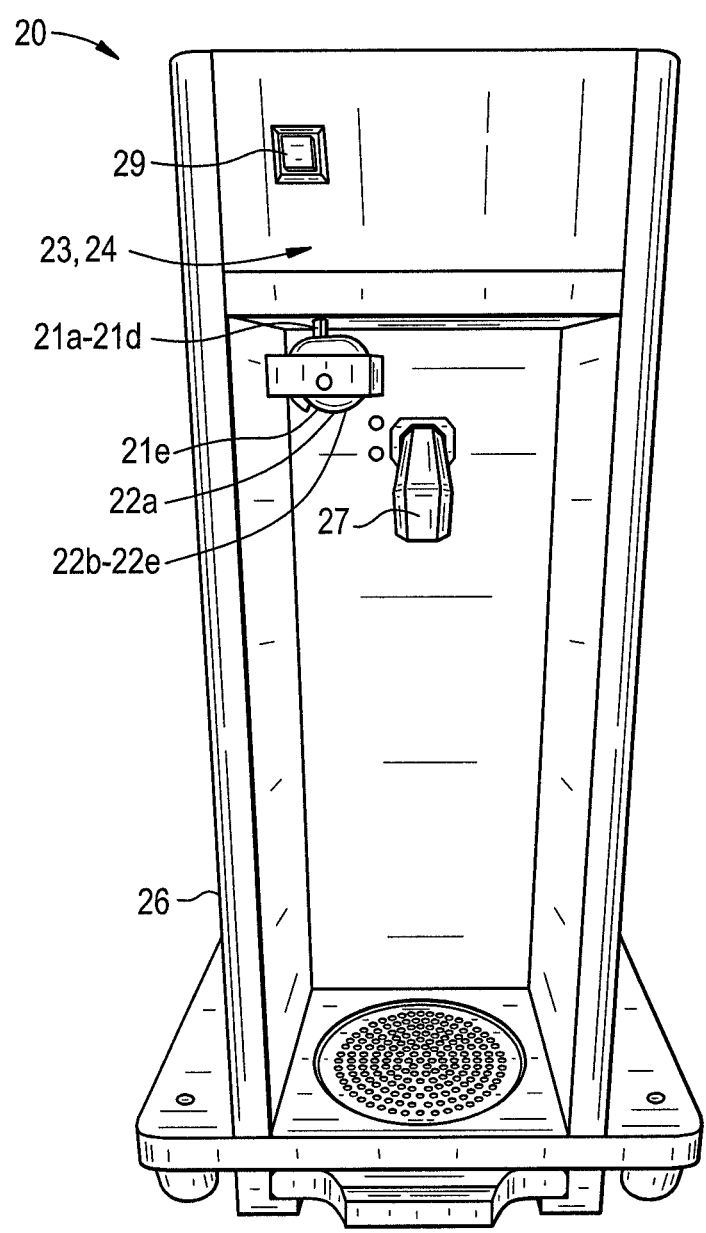

FIG. 2 schematically depicts a second representative embodiment of a dispenser control device 20 in accordance with the present inventive subject matter.

DETAILED DESCRIPTION OF THE INVENTIVE SUBJECT MATTER

The expression "at substantially the same moment," as used herein, means within 0.5 second (and in some cases, within 0.3 second, in some cases, within 0.2 second, in some cases within 0.1 second, in some cases within 0.05 second, in some cases within 0.03 second, in some cases within 0.01 second, in some cases within 0.005 second, in some cases within 0.003 second, in some cases within 0.001 second).

The expression "substantially simultaneously with each other," as used herein, means within 0.05 second, in some cases within 0.03 second, in some cases within 0.01 second, in some cases within 0.005 second, in some cases within 0.003 second, in some cases within 0.001 second.

The present inventive subject matter encompasses many combinations of elements and features. The expression "In some embodiments in accordance with the present inventive subject matter, which can include or not include, as suitable, any of the other features described herein," or the like, is used in the present specification to introduce elements and/or features of the present inventive subject matter that can be included or not included in any particular embodiment, i.e., elements and/or features that can be combined in any suitable way. In other words, the present inventive subject matter encompasses all combinations of elements and/or features that are introduced with the expression "In some embodiments in accordance with the present inventive subject matter, which can include or not include, as suitable, any of the other features described herein," or the like.

Any device that is described herein as comprising an IR light emitter and an IR light detector (e.g., "A dispenser control device, comprising: at least a first IR light emitter and at least a first IR light detector") can comprise an IR light emitter and an IR light detector as separate components, or it can comprise a single component that is capable of emitting IR light and detecting an intensity of IR light, or it can comprise any number of IR light emitters, any number of IR light detectors and/or any number of components that is/are capable of both emitting IR light and detecting an intensity of IR light.

Any device that is described herein as comprising a visible light emitter and a visible light detector (e.g., "A dispenser control device, comprising: at least a first visible light emitter and at least a first visible light detector") can comprise a visible light emitter and a visible light detector as separate components, or it can comprise a single component that is capable of emitting visible light and detecting an intensity of visible light, or it can comprise any number of visible light emitters, any number of visible light detectors and/or any number of components that is/are capable of both emitting visible light and detecting an intensity of visible light.

Any device that is described herein as comprising an IR light emitter and/or a visible light emitter, and/or an IR light detector and/or a visible light detector, can comprise a single component that is capable of emitting IR light, emitting visible light, detecting IR light and detecting visible light, or any combination of components that are capable of doing one or more of such things (including plural components that are capable of doing the same thing, e.g., plural components that can detect IR light and visible light).

Persons of skill in the art are familiar with a wide variety of light emitters and a wide variety of light detectors, and any suitable light emitter(s) and light detector(s) can be employed in dispenser control devices and methods in accordance with the present inventive subject matter. In many cases, specific light emitters are known to be suitable for emitting light within respective particular ranges of wavelengths, and specific light detectors are known to be suitable for detecting light within respective particular ranges of wavelengths. Representative examples of IR light emitters include infrared lasers, and also blackbody radiators, tungsten lamps, silicon carbide and other IR light emitters. Representative examples of IR light detectors include thermal types (e.g., thermocouples, bolometers, pneumatic cells, pyroelectric detectors, etc.), quantum types, e.g., photoconductive types (such as PbS, PbSe, InSb, HgCdTe), photovoltaic types (such as Ge, InGaAs, InAs, InSb, HgCdTe), and extrinsic types (such as Ge:Au, Ge:Hg, Ge:Cu, Ge:Zn, Si:Ga, Si:As). Representative examples of visible light emitters include incandescent lights, light emitting diodes, and visible light lasers, and representative examples of visible light detectors include photo-emissive cells, photo-conductive cells, photo-voltaic cells and photo-junction devices.

The expression "each of said first series of pulses substantially of the first (or any other) light emission intensity," as used herein, means that each of the pulses has a light emission intensity that is within a range of from 90 percent to 110 percent of the first (or other) light emission intensity. Similarly, the expression "the light emitters each emit the first series of light pulses substantially a first reading delay period of time after initiation of said material being dispensed from the dispenser into the receptacle" means that each of the light emitters emits its first series of pulses at a time that is within a range of from 90 percent to 110 percent of the first reading delay period of time after initiation of material being dispensed from the dispenser into the receptacle.

In some embodiments in accordance with the present inventive subject matter, which can include or not include, as suitable, any of the other features described herein, a dispenser control device is configured to sense the environment for ambient IR light (and optionally or alternatively to sense the environment for visible light), whether or not there is a receptacle in a material-receiving location, and in some embodiments in accordance with the present inventive subject matter, which can include or not include, as suitable, any of the other features described herein, a method comprises sensing the environment for ambient IR light (and optionally or alternatively to sense the environment for visible light).

In some embodiments in accordance with the present inventive subject matter, which can include or not include, as suitable, any of the other features described herein, a dispenser control device is configured to sense a receptacle being placed in a material-receiving location (e.g., by sensing a moving hand, a moving receptacle, and/or a moving receptacle holder) and/or a receptacle being present in a material-receiving location, and in some embodiments in accordance with the present inventive subject matter, which can include or not include, as suitable, any of the other features described herein, a method comprises sensing a receptacle being placed in a material-receiving location and/or sensing a receptacle being present in a material-receiving location.

In some embodiments in accordance with the present inventive subject matter, which can include or not include, as suitable, any of the other features described herein, a dispenser control device comprises one or more dispensing request components by which a dispensing request can be made (upon which dispensing of material from a dispenser toward where a receptacle located in a material-receiving location will receive the material is initiated), and in some embodiments in accordance with the present inventive subject matter, which can include or not include, as suitable, any of the other features described herein, a method comprises actuating a dispensing request component to initiate dispensing of material from a dispenser toward a receptacle located in a material-receiving location. In some of such embodiments, a dispensing request component can comprise a "fill" button or lever. In some embodiments, a dispensing request occurs automatically upon a receptacle being placed in a material-receiving location (e.g., dispensing automatically begins a specific time period, e.g., three seconds, after a receptacle is detected in a material-receiving location). In some of such embodiments, a dispenser control device is configured, upon receiving a dispensing request, to initiate any of the activities described herein, e.g., dispensing material and continuing to dispense material until the dispenser control device senses that a light reflection intensity value at which dispensing should be terminated is reached.

In some embodiments in accordance with the present inventive subject matter, which can include or not include, as suitable, any of the other features described herein, there are provided dispenser control devices that comprise a control mechanism for dispensing fluid, e.g., by valve position, by controlling a pump, or with any other suitable way to start and stop flow of material from a dispenser.

As discussed above, some aspects of the present inventive subject matter involve calibrating a dispenser control device using visible light and/or IR light; some aspects of the present inventive subject matter involve a dispenser control device that is configured to calibrate using visible light and/or IR light; some aspects of the present inventive subject matter involve conjecturing as to features of a receptacle in a material-receiving location using visible light and/or IR light; some aspects of the present inventive subject matter involve a dispenser control device that is configured to conjecture as to features of a receptacle in a material-receiving location using visible light and/or IR light; some aspects of the present inventive subject matter involve determining a visible light reflection intensity value at which dispensing should be terminated using visible light and/or IR light; some aspects of the present inventive subject matter involve a dispenser control device that is configured to determine a reflection intensity value (visible light and/or IR light) at which dispensing should be terminated using visible light and/or IR light; some aspects of the present inventive subject matter involve assessing the status of filling a receptacle using visible light and/or IR light; some aspects of the present inventive subject matter involve a dispenser control device that is configured to assess the status of filling a receptacle using visible light and/or IR light; some aspects of the present inventive subject matter involve terminating dispensing when the dispenser control device senses that a visible light reflection intensity value at which dispensing should be terminated is reached or has been reached using visible light and/or IR light; some aspects of the present inventive subject matter involve a dispenser control device that is configured to terminate dispensing when the dispenser control device senses that a visible light reflection intensity value at which dispensing should be terminated is reached or has been reached using visible light and/or IR light; and other aspects of the present inventive subject matter involve any combinations of such activities and/or any combinations of such characteristics in a device (e.g., calibration plus conjecturing as to features of a receptacle, calibration plus conjecturing as to features of a receptacle plus determining a reflection intensity value at which dispensing should be terminated, etc., using visible light and/or IR light for any of the activities).

As described above, in some aspects of the present inventive subject matter, a dispenser control device is configured to conjecture a receptacle type by activities comprising:

(a) setting an IR (and/or visible light) pulse quantity at a calibrated IR (and/or visible light) pulse quantity;
(b) dispensing material into a receptacle;
(c) emitting a series of pulses of IR light (and/or visible light) from at least a first IR emitter (and/or from at least a first visible light emitter), the series of pulses of IR light (and/or visible light) consisting of a quantity of pulses equal to the calibrated IR pulse quantity (and/or the calibrated visible light pulse quantity), each of the series of pulses of a first IR emission intensity or of substantially the first IR emission intensity (and/or of a first visible light emission intensity or of substantially the first visible light emission intensity);
(d) determining an aggregate reflected IR (and/or visible light) intensity value for each IR (and/or visible light) detector at or substantially at a first moment;
(e) summing the respective aggregate reflected IR (and/or visible light) intensity values for the IR (and/or visible light) detector(s) at or substantially at the first moment to determine a combined reflected IR (and/or visible light) intensity value at the first moment;
(f) determining an aggregate reflected IR (and/or visible light) intensity value for each IR (and/or visible light) detector at or substantially at a second moment, the second moment a first time span after the first moment;
(g) summing the respective aggregate reflected IR (and/or visible light) intensity values for the IR (and/or visible light) detector(s) at or substantially at the second moment to determine a combined reflected IR (and/or visible light) intensity value at the second moment;
(h) calculating a combined reflected IR (and/or visible light) intensity slope of change, the combined reflected IR (and/or visible light) intensity slope of change equal to:
(the combined reflected IR (and/or visible light) intensity value at the second moment minus the combined reflected IR (and/or visible light) intensity value at the first moment) divided by the first time span; then
(i) comparing the combined reflected IR (and/or visible light) intensity slope of change with stored slope of reflected IR (and/or visible light) change values for respective receptacle types; and then
(j) based on said comparing, selecting a conjectured receptacle type, the conjectured receptacle type being one of the receptacle types, and in some aspects of the present inventive subject matter, a method comprises such activities.

In such aspects, each stored slope of reflected IR (and/or visible light) change values for a respective receptacle type is an empirically derived average values of a family of receptacles.

As described above, in some aspects of the present inventive subject matter, a dispenser control device is configured to determine an IR light (and/or visible light) reflection intensity value at which dispensing should be terminated, said IR light (and/or visible light) reflection intensity value at which dispensing should be terminated equal to:

a first aggregate reflected IR light (and/or visible light) intensity value (or, where there are a plurality of IR light and/or visible light detectors,
a first combined reflected IR light (and/or visible light) intensity value) divided by a receptacle constant, the receptacle constant equal to a stored value for a conjectured receptacle type, and in some aspects of the present inventive subject matter, a method comprises such activities. This allows the receptacles to be filled to a percentage of maximum capacity, plus or minus a tolerance. In order for the empirically derived stored values for a conjectured receptacle type to yield accurate results, the first aggregate reflected IR light (and/or visible light) intensity value (or the first combined reflected IR light (and/or visible light) intensity value) should be taken at the same time (or substantially the same time, e.g., between 90 percent and 110 percent), relative to when dispensing has been initiated, as when the empirically derived stored values were determined. The time, relative to the initiation of dispensing, at which the first aggregate reflected IR light (and/or visible light) intensity value (or the first combined reflected IR light (and/or visible light) intensity value), is referred to herein as the "first reading delay." In some embodiments in accordance with the present inventive subject matter, which can include or not include, as suitable, any of the other features described herein, the first reading delay is about 1 second. In some embodiments in accordance with the present inventive subject matter, which can include or not include, as suitable, any of the other features described herein, the first reading delay is any other suitable duration of time, e.g., 2 seconds, 3 seconds, 5 seconds, 2.5 seconds, 1.5 seconds, 0.5 seconds, etc.

In embodiments that comprises more than one light emitter, the respective light emitters (emitting IR light, visible light or both IR light and visible light) can emit simultaneously (which includes substantially simultaneously, e.g., within 100 microseconds of each other, within 50 microseconds of each other, within 20 microseconds of each other, within 10 microseconds of each other, etc.), non-simultaneously, or a combination of simultaneously and non-simultaneously (e.g., some light emitters simultaneously at least some of the time, or different combinations of light emitters simultaneously at different occasions).

In embodiments in which there are multiple light emitters, when a quantity of light pulses is increased or decreased (e.g., in calibration, when a light pulse quantity is increased by a light pulse calibration increase value, or when a light pulse quantity is decreased by a light pulse calibration decrease value), (1) the quantity of pulses emitted by each of the light emitters can be increased or decreased by an equal amount, (2) the quantity of pulses emitted by the light emitters can be increased or decreased by respective amounts (at least one amount different from one other amount), or (3) the quantity of pulses emitted by only one of the light emitters can be increased or decreased.

In some aspects of the present inventive subject matter, there is provided a dispenser control device, comprising:
  at least a first light emitter and at least a first light detector;
  a memory component; and
  a calculation component,
  the dispenser control device configured to conduct a sequence of activities comprising (1) calibration, and (2) receptacle-type conjecturing after said calibration,
  said calibration comprising:
    (a) setting a light pulse quantity at an initial light pulse quantity; then
    (b) repeating a calibration sequence comprising:
      (i) emitting from the first light emitter a calibration series of light pulses, each of said calibration series of light pulses substantially of a first light emission intensity, the calibration series of light pulses consisting of a quantity of light pulses equal to the light pulse quantity;
      (ii) each light detector detecting an intensity of reflected light of each light pulse in the calibration series of light pulses;
      (iii) for each light detector, summing the respective intensities of reflected light of the light pulses in the calibration series of light pulses to determine an aggregate calibration reflected light intensity value for the light detector;
      (iv) comparing the aggregate calibration reflected light intensity value for each light detector with a maximum calibration aggregate reflected light intensity value; and then
      (v) if the aggregate calibration reflected light intensity value for each light detector is less than the maximum calibration aggregate reflected IR intensity value, increasing the light pulse quantity by a light pulse calibration increase value,
    until the aggregate calibration reflected light intensity value for at least one light detector equals or exceeds the maximum calibration aggregate reflected light intensity value; and then
    (c) decreasing the light pulse quantity by a light pulse calibration decrease value to arrive at a calibrated light pulse quantity;
  said receptacle-type conjecturing comprising:
    while material is being dispensed from a dispenser into a receptacle:
      emitting from the first light emitter a first series of light pulses, each of said first series of light pulses substantially of the first light emission intensity, the first series of light pulses consisting of a quantity of light pulses equal to the calibrated light pulse quantity;
      each light detector detecting an intensity of reflected light of each light pulse in the first series of light pulses;
      for each light detector, summing the respective intensities of reflected light of the light pulses in the first series of light pulses to determine a first aggregate reflected light intensity value;
      summing the respective first aggregate reflected light intensity values to determine a first combined reflected intensity value; then
      waiting a period of time equal to a receptacle-type conjecturing interval; then
      emitting from the first light emitter a second series of light pulses, each of said second series of light pulses substantially of the first light emission intensity, the second series of light pulses consisting of a quantity of light pulses equal to the calibrated light pulse quantity;
      each light detector detecting an intensity of reflected light of each light pulse in the second series of light pulses;
      for each light detector, summing the respective intensities of reflected light of the light pulses in the second series of light pulses to determine a second aggregate reflected light intensity value;
      summing the respective second aggregate reflected light intensity values to determine a second combined reflected intensity value; then
    the calculation component determining a combined reflected light slope of change, the combined reflected light slope of change equal to:
      (the second combined reflected light intensity value minus the first combined reflected light intensity value) divided by the length of time between the first series of light pulses and the second series of light pulses; then
    the calculation component comparing the combined reflected light slope of change with stored slope of reflected light change values for respective receptacle types stored in the memory component; and then
    the calculation component selecting a conjectured receptacle type, from among receptacle types stored in the memory component, that has a stored slope of reflected light change value that is closest to the combined reflected light slope of change.

In some embodiments in accordance with such aspects of the present inventive subject matter, the first light emitter (or each light emitter, if there are more than one) is an IR light emitter, and each of the at least one light detector is an IR light detector.

In some embodiments in accordance with such aspects of the present inventive subject matter, the dispenser control device comprises a plurality of light detectors.

In some aspects of the present inventive subject matter, there is provided a dispenser control device, comprising:
  at least a first light emitter and at least a first light detector;
  a memory component; and
  a calculation component,
  the dispenser control device configured to conduct a sequence of activities comprising (1) calibration, (2) receptacle-type conjecturing after said calibration, and (3) stopping-intensity value determination after said receptacle-type conjecturing,
  said calibration comprising:
    (a) setting a light pulse quantity at an initial light pulse quantity; then (b) repeating a calibration sequence comprising:
  (i) emitting from the first light emitter a calibration series of light pulses, each of said calibration series of light pulses substantially of a first light emission intensity, the calibration series of light pulses consisting of a quantity of light pulses equal to the light pulse quantity;
  (ii) each light detector detecting an intensity of reflected light of each light pulse in the calibration series of light pulses;
  (iii) for each light detector, summing the respective intensities of reflected light of the light pulses in the calibration series of light pulses to determine an aggregate calibration reflected light intensity value for the light detector;
  (iv) comparing the aggregate calibration reflected light intensity value for each light detector with a maximum calibration aggregate reflected light intensity value; and then
  (v) if the aggregate calibration reflected light intensity value for each light detector is less than the maximum calibration aggregate reflected IR intensity value, increasing the light pulse quantity by a light pulse calibration increase value,
  until the aggregate calibration reflected light intensity value for at least one light detector equals or exceeds the maximum calibration aggregate reflected light intensity value; and then
(c) decreasing the light pulse quantity by a light pulse calibration decrease value to arrive at a calibrated light pulse quantity;
said receptacle-type conjecturing comprising:
  while material is being dispensed from a dispenser into a receptacle:
    emitting from the first light emitter a first series of light pulses, each of said first series of light pulses substantially of the first light emission intensity, the first series of light pulses consisting of a quantity of light pulses equal to the calibrated light pulse quantity;
    each light detector detecting an intensity of reflected light of each light pulse in the first series of light pulses;
    for each light detector, summing the respective intensities of reflected light of the light pulses in the first series of light pulses to determine a first aggregate reflected light intensity value;
    summing the respective first aggregate reflected light intensity values to determine a first combined reflected intensity value; then
    waiting a period of time equal to a receptacle-type conjecturing interval; then
    emitting from the first light emitter a second series of light pulses, each of said second series of light pulses substantially of the first light emission intensity, the second series of light pulses consisting of a quantity of light pulses equal to the calibrated light pulse quantity;
    each light detector detecting an intensity of reflected light of each light pulse in the second series of light pulses;
    for each light detector, summing the respective intensities of reflected light of the light pulses in the second series of light pulses to determine a second aggregate reflected light intensity value;
    summing the respective second aggregate reflected light intensity values to determine a second combined reflected intensity value; then
    the calculation component determining a combined reflected light slope of change, the combined reflected light slope of change equal to:
      (the second combined reflected light intensity value minus the first combined reflected light intensity value) divided by the length of time between the first series of light pulses and the second series of light pulses; then
    the calculation component comparing the combined reflected light slope of change with stored slope of reflected light change values for respective receptacle types stored in the memory component; and then
    the calculation component selecting a conjectured receptacle type, from among receptacle types stored in the memory component, that has a stored slope of reflected light change value that is closest to the combined reflected light slope of change,
  said stopping-intensity value determination comprising the calculation component determining a light reflection intensity value at which dispensing should be terminated, said light reflection intensity value at which dispensing should be terminated equal to:
    the first combined reflected light intensity value divided by a receptacle constant, the receptacle constant equal to a stored value for the conjectured receptacle type.
  In some embodiments in accordance with such aspects of the present inventive subject matter, the first light emitter (or each light emitter, if there are more than one) is an IR light emitter, and each of the at least one light detector is an IR light detector.
  In some embodiments in accordance with such aspects of the present inventive subject matter, the dispenser control device comprises a plurality of light detectors.
  In some aspects of the present inventive subject matter, there is provided a dispenser control device, comprising:
    at least a first light emitter and at least a first light detector;
    a memory component; and
    a calculation component,
    the dispenser control device configured to conduct a sequence of activities comprising (1) calibration, (2) receptacle-type conjecturing after said calibration, (3) stopping-intensity value determination after said receptacle-type conjecturing, and (4) receptacle filling status assessment after said stopping-intensity value determination,
  said calibration comprising:
    (a) setting a light pulse quantity at an initial light pulse quantity; then
    (b) repeating a calibration sequence comprising:
      (i) emitting from the first light emitter a calibration series of light pulses, each of said calibration series of light pulses substantially of a first light emission intensity, the calibration series of light pulses consisting of a quantity of light pulses equal to the light pulse quantity;
      (ii) each light detector detecting an intensity of reflected light of each light pulse in the calibration series of light pulses;
      (iii) for each light detector, summing the respective intensities of reflected light of the light pulses in the calibration series of light pulses to determine an aggregate calibration reflected light intensity value for the light detector;
(iv) comparing the aggregate calibration reflected light intensity value for each light detector with a maximum calibration aggregate reflected light intensity value; and then
(v) if the aggregate calibration reflected light intensity value for each light detector is less than the maximum calibration aggregate reflected IR intensity value, increasing the light pulse quantity by a light pulse calibration increase value,
until the aggregate calibration reflected light intensity value for at least one light detector equals or exceeds the maximum calibration aggregate reflected light intensity value; and then
(c) decreasing the light pulse quantity by a light pulse calibration decrease value to arrive at a calibrated light pulse quantity;
said receptacle-type conjecturing comprising:
while material is being dispensed from a dispenser into a receptacle:
emitting from the first light emitter a first series of light pulses, each of said first series of light pulses substantially of the first light emission intensity, the first series of light pulses consisting of a quantity of light pulses equal to the calibrated light pulse quantity;
each light detector detecting an intensity of reflected light of each light pulse in the first series of light pulses;
for each light detector, summing the respective intensities of reflected light of the light pulses in the first series of light pulses to determine a first aggregate reflected light intensity value;
summing the respective first aggregate reflected light intensity values to determine a first combined reflected intensity value; then
waiting a period of time equal to a receptacle-type conjecturing interval; then
emitting from the first light emitter a second series of light pulses, each of said second series of light pulses substantially of the first light emission intensity, the second series of light pulses consisting of a quantity of light pulses equal to the calibrated light pulse quantity;
each light detector detecting an intensity of reflected light of each light pulse in the second series of light pulses;
for each light detector, summing the respective intensities of reflected light of the light pulses in the second series of light pulses to determine a second aggregate reflected light intensity value;
summing the respective second aggregate reflected light intensity values to determine a second combined reflected intensity value; then
the calculation component determining a combined reflected light slope of change, the combined reflected light slope of change equal to:
(the second combined reflected light intensity value minus the first combined reflected light intensity value) divided by the length of time between the first series of light pulses and the second series of light pulses; then
the calculation component comparing the combined reflected light slope of change with stored slope of reflected light change values for respective receptacle types stored in the memory component; and then
the calculation component selecting a conjectured receptacle type, from among receptacle types stored in the memory component, that has a stored slope of reflected light change value that is closest to the combined reflected light slope of change,
said stopping-intensity value determination comprising the calculation component determining a light reflection intensity value at which dispensing should be terminated, said light reflection intensity value at which dispensing should be terminated equal to:
the first combined reflected light intensity value divided by a receptacle constant, the receptacle constant equal to a stored value for the conjectured receptacle type,
said receptacle filling status assessment comprising:
the calculation component repeating a combined light intensity value comparison sequence comprising:
emitting from the first light emitter a status-assessment series of light pulses, each of said status-assessment series of light pulses substantially of the first light emission intensity, the status-assessment series of light pulses consisting of a quantity of light pulses equal to the calibrated light pulse quantity;
each light detector detecting an intensity of reflected light of each light pulse in the status-assessment series of light pulses;
for each light detector, summing the respective intensities of reflected light of each light pulse in the status-assessment series of light pulses to determine a status-assessment aggregate reflected light intensity value;
summing the respective status-assessment aggregate reflected light intensity values to determine a status-assessment combined reflected light intensity value,
comparing the status-assessment combined reflected light intensity value with said light reflection intensity value at which dispensing should be terminated; and then
if the status-assessment combined reflected light intensity value is greater than said light reflection intensity value at which dispensing should be terminated, waiting a status-assessment interval,
until the status-assessment combined reflected light intensity value is less than or equal to said light reflection intensity value at which dispensing should be terminated.

In some embodiments in accordance with such aspects of the present inventive subject matter, the first light emitter (or each light emitter, if there are more than one) is an IR light emitter, and each of the at least one light detector is an IR light detector.

In some embodiments in accordance with such aspects of the present inventive subject matter, the dispenser control device comprises a plurality of light detectors.

In some aspects of the present inventive subject matter, there is provided a dispenser control device, comprising:
at least a first light emitter and at least a first light detector;
a memory component;
a calculation component; and
a signal transmitter,
the dispenser control device configured to conduct a sequence of activities comprising (1) calibration, (2)

receptacle-type conjecturing after said calibration, (3) stopping-intensity value determination after said receptacle-type conjecturing, (4) receptacle filling status assessment after said stopping-intensity value determination, and (5) dispensing-termination signal transmission after said receptacle filling status assessment, said calibration comprising:
(a) setting a light pulse quantity at an initial light pulse quantity; then
(b) repeating a calibration sequence comprising:
  (i) emitting from the first light emitter a calibration series of light pulses, each of said calibration series of light pulses substantially of a first light emission intensity, the calibration series of light pulses consisting of a quantity of light pulses equal to the light pulse quantity;
  (ii) each light detector detecting an intensity of reflected light of each light pulse in the calibration series of light pulses;
  (iii) for each light detector, summing the respective intensities of reflected light of the light pulses in the calibration series of light pulses to determine an aggregate calibration reflected light intensity value for the light detector;
  (iv) comparing the aggregate calibration reflected light intensity value for each light detector with a maximum calibration aggregate reflected light intensity value; and then
  (v) if the aggregate calibration reflected light intensity value for each light detector is less than the maximum calibration aggregate reflected IR intensity value, increasing the light pulse quantity by a light pulse calibration increase value,
until the aggregate calibration reflected light intensity value for at least one light detector equals or exceeds the maximum calibration aggregate reflected light intensity value; and then
(c) decreasing the light pulse quantity by a light pulse calibration decrease value to arrive at a calibrated light pulse quantity;

said receptacle-type conjecturing comprising:
while material is being dispensed from a dispenser into a receptacle:
  emitting from the first light emitter a first series of light pulses, each of said first series of light pulses substantially of the first light emission intensity, the first series of light pulses consisting of a quantity of light pulses equal to the calibrated light pulse quantity;
  each light detector detecting an intensity of reflected light of each light pulse in the first series of light pulses;
  for each light detector, summing the respective intensities of reflected light of the light pulses in the first series of light pulses to determine a first aggregate reflected light intensity value;
  summing the respective first aggregate reflected light intensity values to determine a first combined reflected intensity value; then
  waiting a period of time equal to a receptacle-type conjecturing interval; then
  emitting from the first light emitter a second series of light pulses, each of said second series of light pulses substantially of the first light emission intensity, the second series of light pulses consisting of a quantity of light pulses equal to the calibrated light pulse quantity;
  each light detector detecting an intensity of reflected light of each light pulse in the second series of light pulses;
  for each light detector, summing the respective intensities of reflected light of the light pulses in the second series of light pulses to determine a second aggregate reflected light intensity value;
  summing the respective second aggregate reflected light intensity values to determine a second combined reflected intensity value; then
  the calculation component determining a combined reflected light slope of change, the combined reflected light slope of change equal to:
    (the second combined reflected light intensity value minus the first combined reflected light intensity value) divided by the length of time between the first series of light pulses and the second series of light pulses; then
  the calculation component comparing the combined reflected light slope of change with stored slope of reflected light change values for respective receptacle types stored in the memory component; and then
  the calculation component selecting a conjectured receptacle type, from among receptacle types stored in the memory component, that has a stored slope of reflected light change value that is closest to the combined reflected light slope of change, said stopping-intensity value determination comprising the calculation component determining a light reflection intensity value at which dispensing should be terminated, said light reflection intensity value at which dispensing should be terminated equal to:
  the first combined reflected light intensity value divided by a receptacle constant, the receptacle constant equal to a stored value for the conjectured receptacle type, said receptacle filling status assessment comprising:
the calculation component repeating a combined light intensity value comparison sequence comprising:
  emitting from the first light emitter a status-assessment series of light pulses, each of said status-assessment series of light pulses substantially of the first light emission intensity, the status-assessment series of light pulses consisting of a quantity of light pulses equal to the calibrated light pulse quantity;
  each light detector detecting an intensity of reflected light of each light pulse in the status-assessment series of light pulses;
  for each light detector, summing the respective intensities of reflected light of each light pulse in the status-assessment series of light pulses to determine a status-assessment aggregate reflected light intensity value;
  summing the respective status-assessment aggregate reflected light intensity values to determine a status-assessment combined reflected light intensity value,
  comparing the status-assessment combined reflected light intensity value with said light reflection intensity value at which dispensing should be terminated; and then
  if the status-assessment combined reflected light intensity value is greater than said light reflection intensity value at which dispensing should be terminated, waiting a status-assessment interval, until the status-assessment combined reflected light intensity value is less than or equal to said light reflection intensity value at which dispensing should be terminated;

said dispensing-termination signal transmission comprising:
upon the calculation component determining that the status-assessment combined reflected light intensity value is less than or equal to said light reflection intensity value at which dispensing should be terminated, the signal transmitter transmitting a dispensing-termination signal, the dispensing-termination signal instructing a dispenser to terminate dispensing.

In some embodiments in accordance with such aspects of the present inventive subject matter, the first light emitter (or each light emitter, if there are more than one) is an IR light emitter, and each of the at least one light detector is an IR light detector.

In some embodiments in accordance with such aspects of the present inventive subject matter, the dispenser control device comprises a plurality of light detectors.

In some aspects of the present inventive subject matter, there is provided a dispenser control device, comprising:
at least a first light emitter and at least a first light detector; and
a calculation component,
the dispenser control device configured to conduct a sequence of activities comprising (1) calibration, and (3) stopping-intensity value determination,
said calibration comprising:
(a) setting a light pulse quantity at an initial light pulse quantity; then
(b) repeating a calibration sequence comprising:
(i) emitting from the first light emitter a calibration series of light pulses, each of said calibration series of light pulses substantially of a first light emission intensity, the calibration series of light pulses consisting of a quantity of light pulses equal to the light pulse quantity;
(ii) each light detector detecting an intensity of reflected light of each light pulse in the calibration series of light pulses;
(iii) for each light detector, summing the respective intensities of reflected light of the light pulses in the calibration series of light pulses to determine an aggregate calibration reflected light intensity value for the light detector;
(iv) comparing the aggregate calibration reflected light intensity value for each light detector with a maximum calibration aggregate reflected light intensity value; and then
(v) if the aggregate calibration reflected light intensity value for each light detector is less than the maximum calibration aggregate reflected IR intensity value, increasing the light pulse quantity by a light pulse calibration increase value,
until the aggregate calibration reflected light intensity value for at least one light detector equals or exceeds the maximum calibration aggregate reflected light intensity value; and then
(c) decreasing the light pulse quantity by a light pulse calibration decrease value to arrive at a calibrated light pulse quantity;
said stopping-intensity value determination comprising the calculation component determining a light reflection intensity value at which dispensing should be terminated, said light reflection intensity value at which dispensing should be terminated equal to:
the first combined reflected light intensity value divided by a receptacle constant, the receptacle constant equal to a stored value for a receptacle type.

In some embodiments in accordance with such aspects of the present inventive subject matter, the first light emitter (or each light emitter, if there are more than one) is an IR light emitter, and each of the at least one light detector is an IR light detector.

In some embodiments in accordance with such aspects of the present inventive subject matter, the dispenser control device comprises a plurality of light detectors.

In some aspects of the present inventive subject matter, there is provided a dispenser control device, comprising:
at least a first light emitter and at least a first light detector; and
a calculation component,
the dispenser control device configured to conduct a sequence of activities comprising (1) calibration, (3) stopping-intensity value determination, and (4) receptacle filling status assessment after said stopping-intensity value determination,
said calibration comprising:
(a) setting a light pulse quantity at an initial light pulse quantity; then
(b) repeating a calibration sequence comprising:
(i) emitting from the first light emitter a calibration series of light pulses, each of said calibration series of light pulses substantially of a first light emission intensity, the calibration series of light pulses consisting of a quantity of light pulses equal to the light pulse quantity;
(ii) each light detector detecting an intensity of reflected light of each light pulse in the calibration series of light pulses;
(iii) for each light detector, summing the respective intensities of reflected light of the light pulses in the calibration series of light pulses to determine an aggregate calibration reflected light intensity value for the light detector;
(iv) comparing the aggregate calibration reflected light intensity value for each light detector with a maximum calibration aggregate reflected light intensity value; and then
(v) if the aggregate calibration reflected light intensity value for each light detector is less than the maximum calibration aggregate reflected IR intensity value, increasing the light pulse quantity by a light pulse calibration increase value,
until the aggregate calibration reflected light intensity value for at least one light detector equals or exceeds the maximum calibration aggregate reflected light intensity value; and then
(c) decreasing the light pulse quantity by a light pulse calibration decrease value to arrive at a calibrated light pulse quantity;
said stopping-intensity value determination comprising the calculation component determining a light reflection intensity value at which dispensing should be terminated, said light reflection intensity value at which dispensing should be terminated equal to:
the first combined reflected light intensity value divided by a receptacle constant, the receptacle constant equal to a stored value for a receptacle type, said receptacle filling status assessment comprising:
the calculation component repeating a combined light intensity value comparison sequence comprising:
emitting from the first light emitter a status-assessment series of light pulses, each of said status-assessment series of light pulses substantially of the first light emission intensity, the status-assessment series of light pulses consisting of a quantity of light pulses equal to the calibrated light pulse quantity;
each light detector detecting an intensity of reflected light of each light pulse in the status-assessment series of light pulses;
for each light detector, summing the respective intensities of reflected light of each light pulse in the status-assessment series of light pulses to determine a status-assessment aggregate reflected light intensity value;
summing the respective status-assessment aggregate reflected light intensity values to determine a status-assessment combined reflected light intensity value,
comparing the status-assessment combined reflected light intensity value with said light reflection intensity value at which dispensing should be terminated; and then
if the status-assessment combined reflected light intensity value is greater than said light reflection intensity value at which dispensing should be terminated, waiting a status-assessment interval,
until the status-assessment combined reflected light intensity value is less than or equal to said light reflection intensity value at which dispensing should be terminated.

In some embodiments in accordance with such aspects of the present inventive subject matter, the first light emitter (or each light emitter, if there are more than one) is an IR light emitter, and each of the at least one light detector is an IR light detector.

In some embodiments in accordance with such aspects of the present inventive subject matter, the dispenser control device comprises a plurality of light detectors.

In some aspects of the present inventive subject matter, there is provided a dispenser control device, comprising:
at least a first light emitter and at least a first light detector; and
a calculation component,
the dispenser control device configured to conduct a sequence of activities comprising (1) calibration, and (4) receptacle filling status assessment,
said calibration comprising:
(a) setting a light pulse quantity at an initial light pulse quantity; then
(b) repeating a calibration sequence comprising:
(i) emitting from the first light emitter a calibration series of light pulses, each of said calibration series of light pulses substantially of a first light emission intensity, the calibration series of light pulses consisting of a quantity of light pulses equal to the light pulse quantity;
(ii) each light detector detecting an intensity of reflected light of each light pulse in the calibration series of light pulses;
(iii) for each light detector, summing the respective intensities of reflected light of the light pulses in the calibration series of light pulses to determine an aggregate calibration reflected light intensity value for the light detector;
(iv) comparing the aggregate calibration reflected light intensity value for each light detector with a maximum calibration aggregate reflected light intensity value; and then
(v) if the aggregate calibration reflected light intensity value for each light detector is less than the maximum calibration aggregate reflected IR intensity value, increasing the light pulse quantity by a light pulse calibration increase value,
until the aggregate calibration reflected light intensity value for at least one light detector equals or exceeds the maximum calibration aggregate reflected light intensity value; and then
(c) decreasing the light pulse quantity by a light pulse calibration decrease value to arrive at a calibrated light pulse quantity;
said receptacle filling status assessment comprising:
the calculation component repeating a combined light intensity value comparison sequence comprising:
emitting from the first light emitter a status-assessment series of light pulses, each of said status-assessment series of light pulses substantially of the first light emission intensity, the status-assessment series of light pulses consisting of a quantity of light pulses equal to the calibrated light pulse quantity;
each light detector detecting an intensity of reflected light of each light pulse in the status-assessment series of light pulses;
for each light detector, summing the respective intensities of reflected light of each light pulse in the status-assessment series of light pulses to determine a status-assessment aggregate reflected light intensity value;
summing the respective status-assessment aggregate reflected light intensity values to determine a status-assessment combined reflected light intensity value,
comparing the status-assessment combined reflected light intensity value with said light reflection intensity value at which dispensing should be terminated; and then
if the status-assessment combined reflected light intensity value is greater than said light reflection intensity value at which dispensing should be terminated, waiting a status-assessment interval,
until the status-assessment combined reflected light intensity value is less than or equal to said light reflection intensity value at which dispensing should be terminated.

In some embodiments in accordance with such aspects of the present inventive subject matter, the first light emitter (or each light emitter, if there are more than one) is an IR light emitter, and each of the at least one light detector is an IR light detector.

In some embodiments in accordance with such aspects of the present inventive subject matter, the dispenser control device comprises a plurality of light detectors.

In some aspects of the present inventive subject matter, there is provided a dispenser control device, comprising:
at least a first light emitter and at least a first light detector;
a memory component; and
a calculation component,
the dispenser control device configured to conduct a sequence of activities comprising (2) receptacle-type conjecturing, and (3) stopping-intensity value determination after said receptacle-type conjecturing, said receptacle-type conjecturing comprising:

while material is being dispensed from a dispenser into a receptacle:

emitting from the first light emitter a first series of light pulses, each of said first series of light pulses substantially of the first light emission intensity, the first series of light pulses consisting of a quantity of light pulses equal to a light pulse quantity;

each light detector detecting an intensity of reflected light of each light pulse in the first series of light pulses;

for each light detector, summing the respective intensities of reflected light of the light pulses in the first series of light pulses to determine a first aggregate reflected light intensity value;

summing the respective first aggregate reflected light intensity values to determine a first combined reflected intensity value; then waiting a period of time equal to a receptacle-type conjecturing interval; then emitting from the first light emitter a second series of light pulses, each of said second series of light pulses substantially of the first light emission intensity, the second series of light pulses consisting of a quantity of light pulses equal to the light pulse quantity;

each light detector detecting an intensity of reflected light of each light pulse in the second series of light pulses;

for each light detector, summing the respective intensities of reflected light of the light pulses in the second series of light pulses to determine a second aggregate reflected light intensity value;

summing the respective second aggregate reflected light intensity values to determine a second combined reflected intensity value; then the calculation component determining a combined reflected light slope of change, the combined reflected light slope of change equal to:

(the second combined reflected light intensity value minus the first combined reflected light intensity value) divided by the length of time between the first series of light pulses and the second series of light pulses; then the calculation component comparing the combined reflected light slope of change with stored slope of reflected light change values for respective receptacle types stored in the memory component; and then the calculation component selecting a conjectured receptacle type, from among receptacle types stored in the memory component, that has a stored slope of reflected light change value that is closest to the combined reflected light slope of change, said stopping-intensity value determination comprising the calculation component determining a light reflection intensity value at which dispensing should be terminated, said light reflection intensity value at which dispensing should be terminated equal to:

the first combined reflected light intensity value divided by a receptacle constant, the receptacle constant equal to a stored value for the conjectured receptacle type.

In some embodiments in accordance with such aspects of the present inventive subject matter, the first light emitter (or each light emitter, if there are more than one) is an IR light emitter, and each of the at least one light detector is an IR light detector.

In some embodiments in accordance with such aspects of the present inventive subject matter, the dispenser control device comprises a plurality of light detectors.

In some aspects of the present inventive subject matter, there is provided a dispenser control device, comprising:

at least a first light emitter and at least a first light detector;

a memory component; and a calculation component, the dispenser control device configured to conduct a sequence of activities comprising (2) receptacle-type conjecturing, (3) stopping-intensity value determination after said receptacle-type conjecturing, and (4) receptacle filling status assessment after said stopping-intensity value determination, said receptacle-type conjecturing comprising:

while material is being dispensed from a dispenser into a receptacle:

emitting from the first light emitter a first series of light pulses, each of said first series of light pulses substantially of the first light emission intensity, the first series of light pulses consisting of a quantity of light pulses equal to a light pulse quantity;

each light detector detecting an intensity of reflected light of each light pulse in the first series of light pulses;

for each light detector, summing the respective intensities of reflected light of the light pulses in the first series of light pulses to determine a first aggregate reflected light intensity value;

summing the respective first aggregate reflected light intensity values to determine a first combined reflected intensity value; then waiting a period of time equal to a receptacle-type conjecturing interval; then emitting from the first light emitter a second series of light pulses, each of said second series of light pulses substantially of the first light emission intensity, the second series of light pulses consisting of a quantity of light pulses equal to the light pulse quantity;

each light detector detecting an intensity of reflected light of each light pulse in the second series of light pulses;

for each light detector, summing the respective intensities of reflected light of the light pulses in the second series of light pulses to determine a second aggregate reflected light intensity value;

summing the respective second aggregate reflected light intensity values to determine a second combined reflected intensity value; then the calculation component determining a combined reflected light slope of change, the combined reflected light slope of change equal to:

(the second combined reflected light intensity value minus the first combined reflected light intensity value) divided by the length of time between the first series of light pulses and the second series of light pulses; then the calculation component comparing the combined reflected light slope of change with stored slope of reflected light change values for respective receptacle types stored in the memory component; and then the calculation component selecting a conjectured receptacle type, from among receptacle types stored in the memory component, that has a stored slope of reflected light change value that is closest to the combined reflected light slope of change, said stopping-intensity value determination comprising the calculation component determining a light reflection intensity value at which dispensing should be terminated, said light reflection intensity value at which dispensing should be terminated equal to:

the first combined reflected light intensity value divided by a receptacle constant, the receptacle constant equal to a stored value for the conjectured receptacle type, said receptacle filling status assessment comprising:

the calculation component repeating a combined light intensity value comparison sequence comprising:

emitting from the first light emitter a status-assessment series of light pulses, each of said status-assessment series of light pulses substantially of the first light emission intensity, the status-assessment series of light pulses consisting of a quantity of light pulses equal to a light pulse quantity;

each light detector detecting an intensity of reflected light of each light pulse in the status-assessment series of light pulses;

for each light detector, summing the respective intensities of reflected light of each light pulse in the status-assessment series of light pulses to determine a status-assessment aggregate reflected light intensity value;

summing the respective status-assessment aggregate reflected light intensity values to determine a status-assessment combined reflected light intensity value, comparing the status-assessment combined reflected light intensity value with said light reflection intensity value at which dispensing should be terminated; and then if the status-assessment combined reflected light intensity value is greater than said light reflection intensity value at which dispensing should be terminated, waiting a status-assessment interval, until the status-assessment combined reflected light intensity value is less than or equal to said light reflection intensity value at which dispensing should be terminated.

In some embodiments in accordance with such aspects of the present inventive subject matter, the first light emitter (or each light emitter, if there are more than one) is an IR light emitter, and each of the at least one light detector is an IR light detector.

In some embodiments in accordance with such aspects of the present inventive subject matter, the dispenser control device comprises a plurality of light detectors.

In some aspects of the present inventive subject matter, there is provided a dispenser control device, comprising:
at least a first light emitter and at least a first light detector;
a memory component;
a calculation component; and
a signal transmitter,
the dispenser control device configured to conduct a sequence of activities comprising (2) receptacle-type conjecturing, (3) stopping-intensity value determination after said receptacle-type conjecturing, (4) receptacle filling status assessment after said stopping-intensity value determination, and (5) dispensing-termination signal transmission after said receptacle filling status assessment, said receptacle-type conjecturing comprising:

while material is being dispensed from a dispenser into a receptacle:

emitting from the first light emitter a first series of light pulses, each of said first series of light pulses substantially of the first light emission intensity, the first series of light pulses consisting of a quantity of light pulses equal to a light pulse quantity;

each light detector detecting an intensity of reflected light of each light pulse in the first series of light pulses;

for each light detector, summing the respective intensities of reflected light of the light pulses in the first series of light pulses to determine a first aggregate reflected light intensity value;

summing the respective first aggregate reflected light intensity values to determine a first combined reflected intensity value; then waiting a period of time equal to a receptacle-type conjecturing interval; then emitting from the first light emitter a second series of light pulses, each of said second series of light pulses substantially of the first light emission intensity, the second series of light pulses consisting of a quantity of light pulses equal to the light pulse quantity;

each light detector detecting an intensity of reflected light of each light pulse in the second series of light pulses;

for each light detector, summing the respective intensities of reflected light of the light pulses in the second series of light pulses to determine a second aggregate reflected light intensity value;

summing the respective second aggregate reflected light intensity values to determine a second combined reflected intensity value; then the calculation component determining a combined reflected light slope of change, the combined reflected light slope of change equal to:

(the second combined reflected light intensity value minus the first combined reflected light intensity value) divided by the length of time between the first series of light pulses and the second series of light pulses; then the calculation component comparing the combined reflected light slope of change with stored slope of reflected light change values for respective receptacle types stored in the memory component; and then the calculation component selecting a conjectured receptacle type, from among receptacle types stored in the memory component, that has a stored slope of reflected light change value that is closest to the combined reflected light slope of change, said stopping-intensity value determination comprising the calculation component determining a light reflection intensity value at which dispensing should be terminated, said light reflection intensity value at which dispensing should be terminated equal to:

the first combined reflected light intensity value divided by a receptacle constant, the receptacle constant equal to a stored value for the conjectured receptacle type, said receptacle filling status assessment comprising:
the calculation component repeating a combined light intensity value comparison sequence comprising:
emitting from the first light emitter a status-assessment series of light pulses, each of said status-assessment series of light pulses substantially of the first light emission intensity, the status-assessment series of light pulses consisting of a quantity of light pulses equal to a light pulse quantity;
each light detector detecting an intensity of reflected light of each light pulse in the status-assessment series of light pulses;
for each light detector, summing the respective intensities of reflected light of each light pulse in the status-assessment series of light pulses to determine a status-assessment aggregate reflected light intensity value;
summing the respective status-assessment aggregate reflected light intensity values to determine a status-assessment combined reflected light intensity value,
comparing the status-assessment combined reflected light intensity value with said light reflection intensity value at which dispensing should be terminated; and then
if the status-assessment combined reflected light intensity value is greater than said light reflection intensity value at which dispensing should be terminated, waiting a status-assessment interval,
until the status-assessment combined reflected light intensity value is less than or equal to said light reflection intensity value at which dispensing should be terminated;

said dispensing-termination signal transmission comprising:
upon the calculation component determining that the status-assessment combined reflected light intensity value is less than or equal to said light reflection intensity value at which dispensing should be terminated, the signal transmitter transmitting a dispensing-termination signal, the dispensing-termination signal instructing a dispenser to terminate dispensing.

In some embodiments in accordance with such aspects of the present inventive subject matter, the first light emitter (or each light emitter, if there are more than one) is an IR light emitter, and each of the at least one light detector is an IR light detector.

In some embodiments in accordance with such aspects of the present inventive subject matter, the dispenser control device comprises a plurality of light detectors.

In some aspects of the present inventive subject matter, there is provided a dispenser control device, comprising:
at least a first light emitter and at least a first light detector; and
a calculation component,
the dispenser control device configured to conduct a sequence of activities comprising (3) stopping-intensity value determination, and (4) receptacle filling status assessment after said stopping-intensity value determination,
said stopping-intensity value determination comprising the calculation component determining a light reflection intensity value at which dispensing should be terminated, said light reflection intensity value at which dispensing should be terminated equal to:
the first combined reflected light intensity value divided by a receptacle constant, the receptacle constant equal to a stored value for a receptacle type, said receptacle filling status assessment comprising:
the calculation component repeating a combined light intensity value comparison sequence comprising:
emitting from the first light emitter a status-assessment series of light pulses, each of said status-assessment series of light pulses substantially of the first light emission intensity, the status-assessment series of light pulses consisting of a quantity of light pulses equal to a light pulse quantity;
each light detector detecting an intensity of reflected light of each light pulse in the status-assessment series of light pulses;
for each light detector, summing the respective intensities of reflected light of each light pulse in the status-assessment series of light pulses to determine a status-assessment aggregate reflected light intensity value;
summing the respective status-assessment aggregate reflected light intensity values to determine a status-assessment combined reflected light intensity value,
comparing the status-assessment combined reflected light intensity value with said light reflection intensity value at which dispensing should be terminated; and then
if the status-assessment combined reflected light intensity value is greater than said light reflection intensity value at which dispensing should be terminated, waiting a status-assessment interval,
until the status-assessment combined reflected light intensity value is less than or equal to said light reflection intensity value at which dispensing should be terminated.

In some embodiments in accordance with such aspects of the present inventive subject matter, the first light emitter (or each light emitter, if there are more than one) is an IR light emitter, and each of the at least one light detector is an IR light detector.

In some embodiments in accordance with such aspects of the present inventive subject matter, the dispenser control device comprises a plurality of light detectors.

In some aspects of the present inventive subject matter, there is provided a dispenser control device, comprising:
at least a first light emitter and at least a first light detector;
a calculation component; and
a signal transmitter,
the dispenser control device configured to conduct a sequence of activities comprising (3) stopping-intensity value determination, (4) receptacle filling status assessment after said stopping-intensity value determination, and (5) dispensing-termination signal transmission after said receptacle filling status assessment,
said stopping-intensity value determination comprising the calculation component determining a light reflection intensity value at which dispensing should be terminated, said light reflection intensity value at which dispensing should be terminated equal to:
the first combined reflected light intensity value divided by a receptacle constant, the receptacle constant equal to a stored value for a receptacle type, said receptacle filling status assessment comprising:
the calculation component repeating a combined light intensity value comparison sequence comprising:
emitting from the first light emitter a status-assessment series of light pulses, each of said status-assessment series of light pulses substantially of the first light emission intensity, the status-assessment series of light pulses consisting of a quantity of light pulses equal to a light pulse quantity;
each light detector detecting an intensity of reflected light of each light pulse in the status-assessment series of light pulses;
for each light detector, summing the respective intensities of reflected light of each light pulse in the status-assessment series of light pulses to determine a status-assessment aggregate reflected light intensity value;
summing the respective status-assessment aggregate reflected light intensity values to determine a status-assessment combined reflected light intensity value,
comparing the status-assessment combined reflected light intensity value with said light reflection intensity value at which dispensing should be terminated; and then
if the status-assessment combined reflected light intensity value is greater than said light reflection intensity value at which dispensing should be terminated, waiting a status-assessment interval,
until the status-assessment combined reflected light intensity value is less than or equal to said light reflection intensity value at which dispensing should be terminated;
said dispensing-termination signal transmission comprising:
upon the calculation component determining that the status-assessment combined reflected light intensity value is less than or equal to said light reflection intensity value at which dispensing should be terminated, the signal transmitter transmitting a dispensing-termination signal, the dispensing-termination signal instructing a dispenser to terminate dispensing.

In some embodiments in accordance with such aspects of the present inventive subject matter, the first light emitter (or each light emitter, if there are more than one) is an IR light emitter, and each of the at least one light detector is an IR light detector.

In some embodiments in accordance with such aspects of the present inventive subject matter, the dispenser control device comprises a plurality of light detectors.

In some aspects of the present inventive subject matter, there is provided a dispenser control device, comprising:
at least a first light emitter and at least a first light detector;
a calculation component; and
a signal transmitter,
the dispenser control device configured to conduct a sequence of activities comprising (4) receptacle filling status assessment, and (5) dispensing-termination signal transmission after said receptacle filling status assessment,
said receptacle filling status assessment comprising:
the calculation component repeating a combined light intensity value comparison sequence comprising:
emitting from the first light emitter a status-assessment series of light pulses, each of said status-assessment series of light pulses substantially of the first light emission intensity, the status-assessment series of light pulses consisting of a quantity of light pulses equal to a light pulse quantity;
each light detector detecting an intensity of reflected light of each light pulse in the status-assessment series of light pulses;
for each light detector, summing the respective intensities of reflected light of each light pulse in the status-assessment series of light pulses to determine a status-assessment aggregate reflected light intensity value;
summing the respective status-assessment aggregate reflected light intensity values to determine a status-assessment combined reflected light intensity value,
comparing the status-assessment combined reflected light intensity value with said light reflection intensity value at which dispensing should be terminated; and then
if the status-assessment combined reflected light intensity value is greater than said light reflection intensity value at which dispensing should be terminated, waiting a status-assessment interval,
until the status-assessment combined reflected light intensity value is less than or equal to said light reflection intensity value at which dispensing should be terminated;
said dispensing-termination signal transmission comprising:
upon the calculation component determining that the status-assessment combined reflected light intensity value is less than or equal to said light reflection intensity value at which dispensing should be terminated, the signal transmitter transmitting a dispensing-termination signal, the dispensing-termination signal instructing a dispenser to terminate dispensing.

In some embodiments in accordance with such aspects of the present inventive subject matter, the first light emitter (or each light emitter, if there are more than one) is an IR light emitter, and each of the at least one light detector is an IR light detector.

In some embodiments in accordance with such aspects of the present inventive subject matter, the dispenser control device comprises a plurality of light detectors.

In some aspects of the present inventive subject matter, there is provided a method, comprising:
conducting a sequence of activities comprising (1) calibration, and (2) receptacle-type conjecturing after said calibration,
said calibration comprising:
(a) setting a light pulse quantity at an initial light pulse quantity; then
(b) repeating a calibration sequence comprising:
(i) emitting from a first light emitter a calibration series of light pulses, each of said calibration series of light pulses substantially of a first light emission intensity, the calibration series of light pulses consisting of a quantity of light pulses equal to the initial light pulse quantity;
(ii) each of at least a first light detector detecting an intensity of reflected light of each light pulse in the calibration series of light pulses;
(iii) for each light detector, summing the respective intensities of reflected light of the light pulses in the calibration series of light pulses to determine an aggregate calibration reflected light intensity value for the light detector;

(iv) comparing the aggregate calibration reflected light intensity value for each light detector with a maximum calibration aggregate reflected light intensity value; and then (v) if the aggregate calibration reflected light intensity value for each light detector is less than the maximum calibration aggregate reflected IR intensity value, increasing the light pulse quantity by a light pulse calibration increase value, until the aggregate calibration reflected light intensity value for at least one light detector equals or exceeds the maximum calibration aggregate reflected light intensity value; and then (c) decreasing the light pulse quantity by a light pulse calibration decrease value to arrive at a calibrated light pulse quantity;

said receptacle-type conjecturing comprising:
while material is being dispensed from a dispenser into a receptacle:
emitting from the first light emitter a first series of light pulses, each of said first series of light pulses substantially of the first light emission intensity, the first series of light pulses consisting of a quantity of light pulses equal to the calibrated light pulse quantity;
each light detector detecting an intensity of reflected light of each light pulse in the first series of light pulses;
for each light detector, summing the respective intensities of reflected light of the light pulses in the first series of light pulses to determine a first aggregate reflected light intensity value;
summing the respective first aggregate reflected light intensity values to determine a first combined reflected intensity value; then
waiting a period of time equal to a receptacle-type conjecturing interval; then
emitting from the first light emitter a second series of light pulses, each of said second series of light pulses substantially of the first light emission intensity, the second series of light pulses consisting of a quantity of light pulses equal to the calibrated light pulse quantity;
each light detector detecting an intensity of reflected light of each light pulse in the second series of light pulses;
for each light detector, summing the respective intensities of reflected light of the light pulses in the second series of light pulses to determine a second aggregate reflected light intensity value;
summing the respective second aggregate reflected light intensity values to determine a second combined reflected intensity value; then
a calculation component determining a combined reflected light slope of change, the combined reflected light slope of change equal to:
(the second combined reflected light intensity value minus the first combined reflected light intensity value) divided by the length of time between the first series of light pulses and the second series of light pulses; then
the calculation component comparing the combined reflected light slope of change with stored slope of reflected light change values for respective receptacle types stored in a memory component; and then
the calculation component selecting a conjectured receptacle type, from among receptacle types stored in the memory component, that has a stored slope of reflected light change value that is closest to the combined reflected light slope of change.

In some embodiments in accordance with such aspects of the present inventive subject matter, the first light emitter (or each light emitter, if there are more than one) is an IR light emitter, and each of the at least one light detector is an IR light detector.

In some embodiments in accordance with such aspects of the present inventive subject matter, the dispenser control device comprises a plurality of light detectors.

In some aspects of the present inventive subject matter, there is provided a method, comprising:
conducting a sequence of activities comprising (1) calibration, (2) receptacle-type conjecturing after said calibration, and (3) stopping-intensity value determination after said receptacle-type conjecturing,
said calibration comprising:
(a) setting a light pulse quantity at an initial light pulse quantity; then
(b) repeating a calibration sequence comprising:
(i) emitting from a first light emitter a calibration series of light pulses, each of said calibration series of light pulses substantially of a first light emission intensity, the calibration series of light pulses consisting of a quantity of light pulses equal to the initial light pulse quantity;
(ii) each of at least a first light detector detecting an intensity of reflected light of each light pulse in the calibration series of light pulses;
(iii) for each light detector, summing the respective intensities of reflected light of the light pulses in the calibration series of light pulses to determine an aggregate calibration reflected light intensity value for the light detector;
(iv) comparing the aggregate calibration reflected light intensity value for each light detector with a maximum calibration aggregate reflected light intensity value; and then
(v) if the aggregate calibration reflected light intensity value for each light detector is less than the maximum calibration aggregate reflected IR intensity value, increasing the light pulse quantity by a light pulse calibration increase value,
until the aggregate calibration reflected light intensity value for at least one light detector equals or exceeds the maximum calibration aggregate reflected light intensity value; and then
(c) decreasing the light pulse quantity by a light pulse calibration decrease value to arrive at a calibrated light pulse quantity;
said receptacle-type conjecturing comprising:
while material is being dispensed from a dispenser into a receptacle:
emitting from the first light emitter a first series of light pulses, each of said first series of light pulses substantially of the first light emission intensity, the first series of light pulses consisting of a quantity of light pulses equal to the calibrated light pulse quantity;
each light detector detecting an intensity of reflected light of each light pulse in the first series of light pulses;
for each light detector, summing the respective intensities of reflected light of the light pulses in the first series of light pulses to determine a first aggregate reflected light intensity value;
summing the respective first aggregate reflected light intensity values to determine a first combined reflected intensity value; then
waiting a period of time equal to a receptacle-type conjecturing interval; then
emitting from the first light emitter a second series of light pulses, each of said second series of light pulses substantially of the first light emission intensity, the second series of light pulses consisting of a quantity of light pulses equal to the calibrated light pulse quantity;
each light detector detecting an intensity of reflected light of each light pulse in the second series of light pulses;
for each light detector, summing the respective intensities of reflected light of the light pulses in the second series of light pulses to determine a second aggregate reflected light intensity value;
summing the respective second aggregate reflected light intensity values to determine a second combined reflected intensity value; then
a calculation component determining a combined reflected light slope of change, the combined reflected light slope of change equal to:
(the second combined reflected light intensity value minus the first combined reflected light intensity value) divided by the length of time between the first series of light pulses and the second series of light pulses; then
the calculation component comparing the combined reflected light slope of change with stored slope of reflected light change values for respective receptacle types stored in a memory component; and then
the calculation component selecting a conjectured receptacle type, from among receptacle types stored in the memory component, that has a stored slope of reflected light change value that is closest to the combined reflected light slope of change,
said stopping-intensity value determination comprising the calculation component determining a light reflection intensity value at which dispensing should be terminated, said light reflection intensity value at which dispensing should be terminated equal to:
the first combined reflected light intensity value divided by a receptacle constant, the receptacle constant equal to a stored value for the conjectured receptacle type.

In some embodiments in accordance with such aspects of the present inventive subject matter, the first light emitter (or each light emitter, if there are more than one) is an IR light emitter, and each of the at least one light detector is an IR light detector.

In some embodiments in accordance with such aspects of the present inventive subject matter, the dispenser control device comprises a plurality of light detectors.

In some aspects of the present inventive subject matter, there is provided a method, comprising:
conducting a sequence of activities comprising (1) calibration, (2) receptacle-type conjecturing after said calibration, (3) stopping-intensity value determination after said receptacle-type conjecturing, and (4) receptacle filling status assessment after said stopping-intensity value determination,
said calibration comprising:
(a) setting a light pulse quantity at an initial light pulse quantity; then
(b) repeating a calibration sequence comprising:
(i) emitting from a first light emitter a calibration series of light pulses, each of said calibration series of light pulses substantially of a first light emission intensity, the calibration series of light pulses consisting of a quantity of light pulses equal to the initial light pulse quantity;
(ii) each of at least a first light detector detecting an intensity of reflected light of each light pulse in the calibration series of light pulses;
(iii) for each light detector, summing the respective intensities of reflected light of the light pulses in the calibration series of light pulses to determine an aggregate calibration reflected light intensity value for the light detector;
(iv) comparing the aggregate calibration reflected light intensity value for each light detector with a maximum calibration aggregate reflected light intensity value; and then
(v) if the aggregate calibration reflected light intensity value for each light detector is less than the maximum calibration aggregate reflected IR intensity value, increasing the light pulse quantity by a light pulse calibration increase value,
until the aggregate calibration reflected light intensity value for at least one light detector equals or exceeds the maximum calibration aggregate reflected light intensity value; and then
(c) decreasing the light pulse quantity by a light pulse calibration decrease value to arrive at a calibrated light pulse quantity;
said receptacle-type conjecturing comprising:
while material is being dispensed from a dispenser into a receptacle:
emitting from the first light emitter a first series of light pulses, each of said first series of light pulses substantially of the first light emission intensity, the first series of light pulses consisting of a quantity of light pulses equal to the calibrated light pulse quantity;
each light detector detecting an intensity of reflected light of each light pulse in the first series of light pulses;
for each light detector, summing the respective intensities of reflected light of the light pulses in the first series of light pulses to determine a first aggregate reflected light intensity value;
summing the respective first aggregate reflected light intensity values to determine a first combined reflected intensity value; then
waiting a period of time equal to a receptacle-type conjecturing interval; then
emitting from the first light emitter a second series of light pulses, each of said second series of light pulses substantially of the first light emission intensity, the second series of light pulses consisting of a quantity of light pulses equal to the calibrated light pulse quantity;
each light detector detecting an intensity of reflected light of each light pulse in the second series of light pulses;
for each light detector, summing the respective intensities of reflected light of the light pulses in the second series of light pulses to determine a second aggregate reflected light intensity value;

summing the respective second aggregate reflected light intensity values to determine a second combined reflected intensity value; then a calculation component determining a combined reflected light slope of change, the combined reflected light slope of change equal to:
(the second combined reflected light intensity value minus the first combined reflected light intensity value) divided by the length of time between the first series of light pulses and the second series of light pulses; then the calculation component comparing the combined reflected light slope of change with stored slope of reflected light change values for respective receptacle types stored in a memory component; and then the calculation component selecting a conjectured receptacle type, from among receptacle types stored in the memory component, that has a stored slope of reflected light change value that is closest to the combined reflected light slope of change, said stopping-intensity value determination comprising the calculation component determining a light reflection intensity value at which dispensing should be terminated, said light reflection intensity value at which dispensing should be terminated equal to:
the first combined reflected light intensity value divided by a receptacle constant, the receptacle constant equal to a stored value for the conjectured receptacle type, said receptacle filling status assessment comprising:
the calculation component repeating a combined light intensity value comparison sequence comprising:
emitting from the first light emitter a status-assessment series of light pulses, each of said status-assessment series of light pulses substantially of the first light emission intensity, the status-assessment series of light pulses consisting of a quantity of light pulses equal to the calibrated light pulse quantity;
each light detector detecting an intensity of reflected light of each light pulse in the status-assessment series of light pulses;
for each light detector, summing the respective intensities of reflected light of each light pulse in the status-assessment series of light pulses to determine a status-assessment aggregate reflected light intensity value;
summing the respective status-assessment aggregate reflected light intensity values to determine a status-assessment combined reflected light intensity value,
comparing the status-assessment combined reflected light intensity value with said light reflection intensity value at which dispensing should be terminated; and then
if the status-assessment combined reflected light intensity value is greater than said light reflection intensity value at which dispensing should be terminated, waiting a status-assessment interval,
until the status-assessment combined reflected light intensity value is less than or equal to said light reflection intensity value at which dispensing should be terminated.

In some embodiments in accordance with such aspects of the present inventive subject matter, the first light emitter (or each light emitter, if there are more than one) is an IR light emitter, and each of the at least one light detector is an IR light detector.

In some embodiments in accordance with such aspects of the present inventive subject matter, the dispenser control device comprises a plurality of light detectors.

In some aspects of the present inventive subject matter, there is provided a method, comprising:
conducting a sequence of activities comprising (1) calibration, (2) receptacle-type conjecturing after said calibration, (3) stopping-intensity value determination after said receptacle-type conjecturing, (4) receptacle filling status assessment after said stopping-intensity value determination, and (5) dispensing-termination signal transmission after said receptacle filling status assessment, said calibration comprising:
(a) setting a light pulse quantity at an initial light pulse quantity; then
(b) repeating a calibration sequence comprising:
(i) emitting from a first light emitter a calibration series of light pulses, each of said calibration series of light pulses substantially of a first light emission intensity, the calibration series of light pulses consisting of a quantity of light pulses equal to the initial light pulse quantity;
(ii) each of at least a first light detector detecting an intensity of reflected light of each light pulse in the calibration series of light pulses;
(iii) for each light detector, summing the respective intensities of reflected light of the light pulses in the calibration series of light pulses to determine an aggregate calibration reflected light intensity value for the light detector;
(iv) comparing the aggregate calibration reflected light intensity value for each light detector with a maximum calibration aggregate reflected light intensity value; and then
(v) if the aggregate calibration reflected light intensity value for each light detector is less than the maximum calibration aggregate reflected IR intensity value, increasing the light pulse quantity by a light pulse calibration increase value,
until the aggregate calibration reflected light intensity value for at least one light detector equals or exceeds the maximum calibration aggregate reflected light intensity value; and then
(c) decreasing the light pulse quantity by a light pulse calibration decrease value to arrive at a calibrated light pulse quantity;

said receptacle-type conjecturing comprising:
while material is being dispensed from a dispenser into a receptacle:
emitting from the first light emitter a first series of light pulses, each of said first series of light pulses substantially of the first light emission intensity, the first series of light pulses consisting of a quantity of light pulses equal to the calibrated light pulse quantity;
each light detector detecting an intensity of reflected light of each light pulse in the first series of light pulses;
for each light detector, summing the respective intensities of reflected light of the light pulses in the first series of light pulses to determine a first aggregate reflected light intensity value;

summing the respective first aggregate reflected light intensity values to determine a first combined reflected intensity value; then waiting a period of time equal to a receptacle-type conjecturing interval; then emitting from the first light emitter a second series of light pulses, each of said second series of light pulses substantially of the first light emission intensity, the second series of light pulses consisting of a quantity of light pulses equal to the calibrated light pulse quantity;

each light detector detecting an intensity of reflected light of each light pulse in the second series of light pulses;

for each light detector, summing the respective intensities of reflected light of the light pulses in the second series of light pulses to determine a second aggregate reflected light intensity value;

summing the respective second aggregate reflected light intensity values to determine a second combined reflected intensity value; then a calculation component determining a combined reflected light slope of change, the combined reflected light slope of change equal to:

(the second combined reflected light intensity value minus the first combined reflected light intensity value) divided by the length of time between the first series of light pulses and the second series of light pulses; then the calculation component comparing the combined reflected light slope of change with stored slope of reflected light change values for respective receptacle types stored in a memory component; and then the calculation component selecting a conjectured receptacle type, from among receptacle types stored in the memory component, that has a stored slope of reflected light change value that is closest to the combined reflected light slope of change, said stopping-intensity value determination comprising the calculation component determining a light reflection intensity value at which dispensing should be terminated, said light reflection intensity value at which dispensing should be terminated equal to:

the first combined reflected light intensity value divided by a receptacle constant, the receptacle constant equal to a stored value for the conjectured receptacle type, said receptacle filling status assessment comprising:
the calculation component repeating a combined light intensity value comparison sequence comprising:
emitting from the first light emitter a status-assessment series of light pulses, each of said status-assessment series of light pulses substantially of the first light emission intensity, the status-assessment series of light pulses consisting of a quantity of light pulses equal to the calibrated light pulse quantity;

each light detector detecting an intensity of reflected light of each light pulse in the status-assessment series of light pulses;

for each light detector, summing the respective intensities of reflected light of each light pulse in the status-assessment series of light pulses to determine a status-assessment aggregate reflected light intensity value;

summing the respective status-assessment aggregate reflected light intensity values to determine a status-assessment combined reflected light intensity value, comparing the status-assessment combined reflected light intensity value with said light reflection intensity value at which dispensing should be terminated; and then if the status-assessment combined reflected light intensity value is greater than said light reflection intensity value at which dispensing should be terminated, waiting a status-assessment interval, until the status-assessment combined reflected light intensity value is less than or equal to said light reflection intensity value at which dispensing should be terminated;

said dispensing-termination signal transmission comprising:
upon the calculation component determining that the status-assessment combined reflected light intensity value is less than or equal to said light reflection intensity value at which dispensing should be terminated, a signal transmitter transmitting a dispensing-termination signal, the dispensing-termination signal instructing a dispenser to terminate dispensing.

In some embodiments in accordance with such aspects of the present inventive subject matter, the first light emitter (or each light emitter, if there are more than one) is an IR light emitter, and each of the at least one light detector is an IR light detector.

In some embodiments in accordance with such aspects of the present inventive subject matter, the dispenser control device comprises a plurality of light detectors.

In some aspects of the present inventive subject matter, there is provided a method, comprising:
conducting a sequence of activities comprising (1) calibration, and (3) stopping-intensity value determination, said calibration comprising:
(a) setting a light pulse quantity at an initial light pulse quantity; then
(b) repeating a calibration sequence comprising:
(i) emitting from a first light emitter a calibration series of light pulses, each of said calibration series of light pulses substantially of a first light emission intensity, the calibration series of light pulses consisting of a quantity of light pulses equal to the initial light pulse quantity;
(ii) each of at least a first light detector detecting an intensity of reflected light of each light pulse in the calibration series of light pulses;
(iii) for each light detector, summing the respective intensities of reflected light of the light pulses in the calibration series of light pulses to determine an aggregate calibration reflected light intensity value for the light detector;
(iv) comparing the aggregate calibration reflected light intensity value for each light detector with a maximum calibration aggregate reflected light intensity value; and then
(v) if the aggregate calibration reflected light intensity value for each light detector is less than the maximum calibration aggregate reflected IR intensity value, increasing the light pulse quantity by a light pulse calibration increase value, until the aggregate calibration reflected light intensity value for at least one light detector equals or exceeds the maximum calibration aggregate reflected light intensity value; and then
(c) decreasing the light pulse quantity by a light pulse calibration decrease value to arrive at a calibrated light pulse quantity;

said stopping-intensity value determination comprising a calculation component determining a light reflection intensity value at which dispensing should be terminated, said light reflection intensity value at which dispensing should be terminated equal to:
the first combined reflected light intensity value divided by a receptacle constant, the receptacle constant equal to a stored value for a receptacle type.

In some embodiments in accordance with such aspects of the present inventive subject matter, the first light emitter (or each light emitter, if there are more than one) is an IR light emitter, and each of the at least one light detector is an IR light detector.

In some embodiments in accordance with such aspects of the present inventive subject matter, the dispenser control device comprises a plurality of light detectors.

In some aspects of the present inventive subject matter, there is provided a method, comprising:
conducting a sequence of activities comprising (1) calibration, (3) stopping-intensity value determination, and (4) receptacle filling status assessment after said stopping-intensity value determination,
said calibration comprising:
(a) setting a light pulse quantity at an initial light pulse quantity; then
(b) repeating a calibration sequence comprising:
(i) emitting from a first light emitter a calibration series of light pulses, each of said calibration series of light pulses substantially of a first light emission intensity, the calibration series of light pulses consisting of a quantity of light pulses equal to the initial light pulse quantity;
(ii) each of at least a first light detector detecting an intensity of reflected light of each light pulse in the calibration series of light pulses;
(iii) for each light detector, summing the respective intensities of reflected light of the light pulses in the calibration series of light pulses to determine an aggregate calibration reflected light intensity value for the light detector;
(iv) comparing the aggregate calibration reflected light intensity value for each light detector with a maximum calibration aggregate reflected light intensity value; and then
(v) if the aggregate calibration reflected light intensity value for each light detector is less than the maximum calibration aggregate reflected IR intensity value, increasing the light pulse quantity by a light pulse calibration increase value,
until the aggregate calibration reflected light intensity value for at least one light detector equals or exceeds the maximum calibration aggregate reflected light intensity value; and then
(c) decreasing the light pulse quantity by a light pulse calibration decrease value to arrive at a calibrated light pulse quantity;
said stopping-intensity value determination comprising a calculation component determining a light reflection intensity value at which dispensing should be terminated, said light reflection intensity value at which dispensing should be terminated equal to:
the first combined reflected light intensity value divided by a receptacle constant, the receptacle constant equal to a stored value for a receptacle type,
said receptacle filling status assessment comprising:
the calculation component repeating a combined light intensity value comparison sequence comprising:
emitting from the first light emitter a status-assessment series of light pulses, each of said status-assessment series of light pulses substantially of the first light emission intensity, the status-assessment series of light pulses consisting of a quantity of light pulses equal to the calibrated light pulse quantity;
each light detector detecting an intensity of reflected light of each light pulse in the status-assessment series of light pulses;
for each light detector, summing the respective intensities of reflected light of each light pulse in the status-assessment series of light pulses to determine a status-assessment aggregate reflected light intensity value;
summing the respective status-assessment aggregate reflected light intensity values to determine a status-assessment combined reflected light intensity value,
comparing the status-assessment combined reflected light intensity value with said light reflection intensity value at which dispensing should be terminated; and then
if the status-assessment combined reflected light intensity value is greater than said light reflection intensity value at which dispensing should be terminated, waiting a status-assessment interval,
until the status-assessment combined reflected light intensity value is less than or equal to said light reflection intensity value at which dispensing should be terminated.

In some embodiments in accordance with such aspects of the present inventive subject matter, the first light emitter (or each light emitter, if there are more than one) is an IR light emitter, and each of the at least one light detector is an IR light detector.

In some embodiments in accordance with such aspects of the present inventive subject matter, the dispenser control device comprises a plurality of light detectors.

In some aspects of the present inventive subject matter, there is provided a method, comprising:
conducting a sequence of activities comprising (1) calibration, and (4) receptacle filling status assessment,
said calibration comprising:
(a) setting a light pulse quantity at an initial light pulse quantity; then
(b) repeating a calibration sequence comprising:
(i) emitting from a first light emitter a calibration series of light pulses, each of said calibration series of light pulses substantially of a first light emission intensity, the calibration series of light pulses consisting of a quantity of light pulses equal to the initial light pulse quantity;
(ii) each of at least a first light detector detecting an intensity of reflected light of each light pulse in the calibration series of light pulses;
(iii) for each light detector, summing the respective intensities of reflected light of the light pulses in the calibration series of light pulses to determine an aggregate calibration reflected light intensity value for the light detector;
(iv) comparing the aggregate calibration reflected light intensity value for each light detector with a maximum calibration aggregate reflected light intensity value; and then
(v) if the aggregate calibration reflected light intensity value for each light detector is less than the maximum calibration aggregate reflected IR intensity value, increasing the light pulse quantity by a light pulse calibration increase value,
until the aggregate calibration reflected light intensity value for at least one light detector equals or exceeds the maximum calibration aggregate reflected light intensity value; and then
(c) decreasing the light pulse quantity by a light pulse calibration decrease value to arrive at a calibrated light pulse quantity;
said receptacle filling status assessment comprising:
a calculation component repeating a combined light intensity value comparison sequence comprising:
emitting from the first light emitter a status-assessment series of light pulses, each of said status-assessment series of light pulses substantially of the first light emission intensity, the status-assessment series of light pulses consisting of a quantity of light pulses equal to the calibrated light pulse quantity;
each light detector detecting an intensity of reflected light of each light pulse in the status-assessment series of light pulses;
for each light detector, summing the respective intensities of reflected light of each light pulse in the status-assessment series of light pulses to determine a status-assessment aggregate reflected light intensity value;
summing the respective status-assessment aggregate reflected light intensity values to determine a status-assessment combined reflected light intensity value,
comparing the status-assessment combined reflected light intensity value with said light reflection intensity value at which dispensing should be terminated; and then
if the status-assessment combined reflected light intensity value is greater than said light reflection intensity value at which dispensing should be terminated, waiting a status-assessment interval,
until the status-assessment combined reflected light intensity value is less than or equal to said light reflection intensity value at which dispensing should be terminated.

In some embodiments in accordance with such aspects of the present inventive subject matter, the first light emitter (or each light emitter, if there are more than one) is an IR light emitter, and each of the at least one light detector is an IR light detector.

In some embodiments in accordance with such aspects of the present inventive subject matter, the dispenser control device comprises a plurality of light detectors.

In some aspects of the present inventive subject matter, there is provided a method, comprising:
conducting a sequence of activities comprising (2) receptacle-type conjecturing, and (3) stopping-intensity value determination after said receptacle-type conjecturing,
said receptacle-type conjecturing comprising:
while material is being dispensed from a dispenser into a receptacle:
emitting from a first light emitter a first series of light pulses, each of said first series of light pulses substantially of the first light emission intensity, the first series of light pulses consisting of a quantity of light pulses equal to a light pulse quantity;
each light detector detecting an intensity of reflected light of each light pulse in the first series of light pulses;
for each of at least a first light detector, summing the respective intensities of reflected light of the light pulses in the first series of light pulses to determine a first aggregate reflected light intensity value;
summing the respective first aggregate reflected light intensity values to determine a first combined reflected intensity value; then
waiting a period of time equal to a receptacle-type conjecturing interval; then
emitting from the first light emitter a second series of light pulses, each of said second series of light pulses substantially of the first light emission intensity, the second series of light pulses consisting of a quantity of light pulses equal to a light pulse quantity;
each light detector detecting an intensity of reflected light of each light pulse in the second series of light pulses;
for each light detector, summing the respective intensities of reflected light of the light pulses in the second series of light pulses to determine a second aggregate reflected light intensity value;
summing the respective second aggregate reflected light intensity values to determine a second combined reflected intensity value; then
a calculation component determining a combined reflected light slope of change, the combined reflected light slope of change equal to:
(the second combined reflected light intensity value minus the first combined reflected light intensity value) divided by the length of time between the first series of light pulses and the second series of light pulses; then
the calculation component comparing the combined reflected light slope of change with stored slope of reflected light change values for respective receptacle types stored in a memory component; and then
the calculation component selecting a conjectured receptacle type, from among receptacle types stored in the memory component, that has a stored slope of reflected light change value that is closest to the combined reflected light slope of change,
said stopping-intensity value determination comprising the calculation component determining a light reflection intensity value at which dispensing should be terminated, said light reflection intensity value at which dispensing should be terminated equal to:
the first combined reflected light intensity value divided by a receptacle constant, the receptacle constant equal to a stored value for the conjectured receptacle type.

In some embodiments in accordance with such aspects of the present inventive subject matter, the first light emitter (or each light emitter, if there are more than one) is an IR light emitter, and each of the at least one light detector is an IR light detector.

In some embodiments in accordance with such aspects of the present inventive subject matter, the dispenser control device comprises a plurality of light detectors.

In some aspects of the present inventive subject matter, there is provided a method, comprising:
conducting a sequence of activities comprising (2) receptacle-type conjecturing, (3) stopping-intensity value determination after said receptacle-type conjecturing, and (4) receptacle filling status assessment after said stopping-intensity value determination,
said receptacle-type conjecturing comprising:
while material is being dispensed from a dispenser into a receptacle:
emitting from a first light emitter a first series of light pulses, each of said first series of light pulses substantially of the first light emission intensity, the first series of light pulses consisting of a quantity of light pulses equal to a light pulse quantity;
each light detector detecting an intensity of reflected light of each light pulse in the first series of light pulses;
for each of at least a first light detector, summing the respective intensities of reflected light of the light pulses in the first series of light pulses to determine a first aggregate reflected light intensity value;
summing the respective first aggregate reflected light intensity values to determine a first combined reflected intensity value; then
waiting a period of time equal to a receptacle-type conjecturing interval; then
emitting from the first light emitter a second series of light pulses, each of said second series of light pulses substantially of the first light emission intensity, the second series of light pulses consisting of a quantity of light pulses equal to a light pulse quantity;
each light detector detecting an intensity of reflected light of each light pulse in the second series of light pulses;
for each light detector, summing the respective intensities of reflected light of the light pulses in the second series of light pulses to determine a second aggregate reflected light intensity value;
summing the respective second aggregate reflected light intensity values to determine a second combined reflected intensity value; then
a calculation component determining a combined reflected light slope of change, the combined reflected light slope of change equal to:
(the second combined reflected light intensity value minus the first combined reflected light intensity value) divided by the length of time between the first series of light pulses and the second series of light pulses; then
the calculation component comparing the combined reflected light slope of change with stored slope of reflected light change values for respective receptacle types stored in a memory component; and then
the calculation component selecting a conjectured receptacle type, from among receptacle types stored in the memory component, that has a stored slope of reflected light change value that is closest to the combined reflected light slope of change,
said stopping-intensity value determination comprising the calculation component determining a light reflection intensity value at which dispensing should be terminated, said light reflection intensity value at which dispensing should be terminated equal to:
the first combined reflected light intensity value divided by a receptacle constant, the receptacle constant equal to a stored value for the conjectured receptacle type,
said receptacle filling status assessment comprising:
the calculation component repeating a combined light intensity value comparison sequence comprising:
emitting from the first light emitter a status-assessment series of light pulses, each of said status-assessment series of light pulses substantially of the first light emission intensity, the status-assessment series of light pulses consisting of a quantity of light pulses equal to a light pulse quantity;
each light detector detecting an intensity of reflected light of each light pulse in the status-assessment series of light pulses;
for each light detector, summing the respective intensities of reflected light of each light pulse in the status-assessment series of light pulses to determine a status-assessment aggregate reflected light intensity value;
summing the respective status-assessment aggregate reflected light intensity values to determine a status-assessment combined reflected light intensity value,
comparing the status-assessment combined reflected light intensity value with said light reflection intensity value at which dispensing should be terminated; and then
if the status-assessment combined reflected light intensity value is greater than said light reflection intensity value at which dispensing should be terminated, waiting a status-assessment interval,
until the status-assessment combined reflected light intensity value is less than or equal to said light reflection intensity value at which dispensing should be terminated.

In some embodiments in accordance with such aspects of the present inventive subject matter, the first light emitter (or each light emitter, if there are more than one) is an IR light emitter, and each of the at least one light detector is an IR light detector.

In some embodiments in accordance with such aspects of the present inventive subject matter, the dispenser control device comprises a plurality of light detectors.

In some aspects of the present inventive subject matter, there is provided a method, comprising:
conducting a sequence of activities comprising (2) receptacle-type conjecturing, (3) stopping-intensity value determination after said receptacle-type conjecturing, (4) receptacle filling status assessment after said stopping-intensity value determination, and (5) dispensing-termination signal transmission after said receptacle filling status assessment,
said receptacle-type conjecturing comprising:
while material is being dispensed from a dispenser into a receptacle:
emitting from a first light emitter a first series of light pulses, each of said first series of light pulses substantially of the first light emission intensity, the first series of light pulses consisting of a quantity of light pulses equal to a light pulse quantity;

each light detector detecting an intensity of reflected light of each light pulse in the first series of light pulses;

for each of at least a first light detector, summing the respective intensities of reflected light of the light pulses in the first series of light pulses to determine a first aggregate reflected light intensity value;

summing the respective first aggregate reflected light intensity values to determine a first combined reflected intensity value; then waiting a period of time equal to a receptacle-type conjecturing interval; then emitting from the first light emitter a second series of light pulses, each of said second series of light pulses substantially of the first light emission intensity, the second series of light pulses consisting of a quantity of light pulses equal to a light pulse quantity;

each light detector detecting an intensity of reflected light of each light pulse in the second series of light pulses;

for each light detector, summing the respective intensities of reflected light of the light pulses in the second series of light pulses to determine a second aggregate reflected light intensity value;

summing the respective second aggregate reflected light intensity values to determine a second combined reflected intensity value; then a calculation component determining a combined reflected light slope of change, the combined reflected light slope of change equal to:
(the second combined reflected light intensity value minus the first combined reflected light intensity value) divided by the length of time between the first series of light pulses and the second series of light pulses; then the calculation component comparing the combined reflected light slope of change with stored slope of reflected light change values for respective receptacle types stored in a memory component; and then the calculation component selecting a conjectured receptacle type, from among receptacle types stored in the memory component, that has a stored slope of reflected light change value that is closest to the combined reflected light slope of change, said stopping-intensity value determination comprising the calculation component determining a light reflection intensity value at which dispensing should be terminated, said light reflection intensity value at which dispensing should be terminated equal to:
the first combined reflected light intensity value divided by a receptacle constant, the receptacle constant equal to a stored value for the conjectured receptacle type, said receptacle filling status assessment comprising:
the calculation component repeating a combined light intensity value comparison sequence comprising:
emitting from the first light emitter a status-assessment series of light pulses, each of said status-assessment series of light pulses substantially of the first light emission intensity, the status-assessment series of light pulses consisting of a quantity of light pulses equal to a light pulse quantity;

each light detector detecting an intensity of reflected light of each light pulse in the status-assessment series of light pulses;

for each light detector, summing the respective intensities of reflected light of each light pulse in the status-assessment series of light pulses to determine a status-assessment aggregate reflected light intensity value;

summing the respective status-assessment aggregate reflected light intensity values to determine a status-assessment combined reflected light intensity value, comparing the status-assessment combined reflected light intensity value with said light reflection intensity value at which dispensing should be terminated; and then if the status-assessment combined reflected light intensity value is greater than said light reflection intensity value at which dispensing should be terminated, waiting a status-assessment interval, until the status-assessment combined reflected light intensity value is less than or equal to said light reflection intensity value at which dispensing should be terminated;

said dispensing-termination signal transmission comprising:
upon the calculation component determining that the status-assessment combined reflected light intensity value is less than or equal to said light reflection intensity value at which dispensing should be terminated, a signal transmitter transmitting a dispensing-termination signal, the dispensing-termination signal instructing a dispenser to terminate dispensing.

In some embodiments in accordance with such aspects of the present inventive subject matter, the first light emitter (or each light emitter, if there are more than one) is an IR light emitter, and each of the at least one light detector is an IR light detector.

In some embodiments in accordance with such aspects of the present inventive subject matter, the dispenser control device comprises a plurality of light detectors.

In some aspects of the present inventive subject matter, there is provided a method, comprising:
conducting a sequence of activities comprising (3) stopping-intensity value determination, and (4) receptacle filling status assessment after said stopping-intensity value determination, said stopping-intensity value determination comprising a calculation component determining a light reflection intensity value at which dispensing should be terminated, said light reflection intensity value at which dispensing should be terminated equal to:
the first combined reflected light intensity value divided by a receptacle constant, the receptacle constant equal to a stored value for a receptacle type, said receptacle filling status assessment comprising:
the calculation component repeating a combined light intensity value comparison sequence comprising:
emitting from a first light emitter a status-assessment series of light pulses, each of said status-assessment series of light pulses substantially of the first light emission intensity, the status-assessment series of light pulses consisting of a quantity of light pulses equal to a light pulse quantity;

each of at least a first light detector detecting an intensity of reflected light of each light pulse in the status-assessment series of light pulses;

for each light detector, summing the respective intensities of reflected light of each light pulse in the status-assessment series of light pulses to determine a status-assessment aggregate reflected light intensity value;

summing the respective status-assessment aggregate reflected light intensity values to determine a status-assessment combined reflected light intensity value, comparing the status-assessment combined reflected light intensity value with said light reflection intensity value at which dispensing should be terminated; and then if the status-assessment combined reflected light intensity value is greater than said light reflection intensity value at which dispensing should be terminated, waiting a status-assessment interval, until the status-assessment combined reflected light intensity value is less than or equal to said light reflection intensity value at which dispensing should be terminated.

In some embodiments in accordance with such aspects of the present inventive subject matter, the first light emitter (or each light emitter, if there are more than one) is an IR light emitter, and each of the at least one light detector is an IR light detector.

In some embodiments in accordance with such aspects of the present inventive subject matter, the dispenser control device comprises a plurality of light detectors.

In some aspects of the present inventive subject matter, there is provided a method, comprising:

conducting a sequence of activities comprising (3) stopping-intensity value determination, (4) receptacle filling status assessment after said stopping-intensity value determination, and (5) dispensing-termination signal transmission after said receptacle filling status assessment, said stopping-intensity value determination comprising a calculation component determining a light reflection intensity value at which dispensing should be terminated, said light reflection intensity value at which dispensing should be terminated equal to:

the first combined reflected light intensity value divided by a receptacle constant, the receptacle constant equal to a stored value for a receptacle type, said receptacle filling status assessment comprising:

the calculation component repeating a combined light intensity value comparison sequence comprising:

emitting from a first light emitter a status-assessment series of light pulses, each of said status-assessment series of light pulses substantially of the first light emission intensity, the status-assessment series of light pulses consisting of a quantity of light pulses equal to a light pulse quantity;

each of at least a first light detector detecting an intensity of reflected light of each light pulse in the status-assessment series of light pulses;

for each light detector, summing the respective intensities of reflected light of each light pulse in the status-assessment series of light pulses to determine a status-assessment aggregate reflected light intensity value;

summing the respective status-assessment aggregate reflected light intensity values to determine a status-assessment combined reflected light intensity value, comparing the status-assessment combined reflected light intensity value with said light reflection intensity value at which dispensing should be terminated; and then if the status-assessment combined reflected light intensity value is greater than said light reflection intensity value at which dispensing should be terminated, waiting a status-assessment interval, until the status-assessment combined reflected light intensity value is less than or equal to said light reflection intensity value at which dispensing should be terminated;

said dispensing-termination signal transmission comprising:

upon the calculation component determining that the status-assessment combined reflected light intensity value is less than or equal to said light reflection intensity value at which dispensing should be terminated, a signal transmitter transmitting a dispensing-termination signal, the dispensing-termination signal instructing a dispenser to terminate dispensing.

In some embodiments in accordance with such aspects of the present inventive subject matter, the first light emitter (or each light emitter, if there are more than one) is an IR light emitter, and each of the at least one light detector is an IR light detector.

In some embodiments in accordance with such aspects of the present inventive subject matter, the dispenser control device comprises a plurality of light detectors.

In some aspects of the present inventive subject matter, there is provided a method, comprising:

conducting a sequence of activities comprising (4) receptacle filling status assessment, and (5) dispensing-termination signal transmission after said receptacle filling status assessment, said receptacle filling status assessment comprising:

a calculation component repeating a combined light intensity value comparison sequence comprising:

emitting from a first light emitter a status-assessment series of light pulses, each of said status-assessment series of light pulses substantially of the first light emission intensity, the status-assessment series of light pulses consisting of a quantity of light pulses equal to a light pulse quantity;

each of at least a first light detector detecting an intensity of reflected light of each light pulse in the status-assessment series of light pulses;

for each light detector, summing the respective intensities of reflected light of each light pulse in the status-assessment series of light pulses to determine a status-assessment aggregate reflected light intensity value;

summing the respective status-assessment aggregate reflected light intensity values to determine a status-assessment combined reflected light intensity value, comparing the status-assessment combined reflected light intensity value with said light reflection intensity value at which dispensing should be terminated; and then if the status-assessment combined reflected light intensity value is greater than said light reflection intensity value at which dispensing should be terminated, waiting a status-assessment interval, until the status-assessment combined reflected light intensity value is less than or equal to said light reflection intensity value at which dispensing should be terminated;

said dispensing-termination signal transmission comprising:

upon the calculation component determining that the status-assessment combined reflected light intensity value is less than or equal to said light reflection intensity value at which dispensing should be terminated, a signal transmitter transmitting a dispensing-termination signal, the dispensing-termination signal instructing a dispenser to terminate dispensing.

In some embodiments in accordance with such aspects of the present inventive subject matter, the first light emitter (or each light emitter, if there are more than one) is an IR light emitter, and each of the at least one light detector is an IR light detector.

In some embodiments in accordance with such aspects of the present inventive subject matter, the dispenser control device comprises a plurality of light detectors.

The following description of representative embodiments is provided to give an illustration of a representative device that falls within the scope of the present inventive subject matter, and to explain representative methods that fall within the scope of the present inventive subject matter. The present inventive subject matter is not limited to details of the described embodiments.

FIG. 1 schematically depicts a representative embodiment of a dispenser control device 10 in accordance with the present inventive subject matter. The dispenser control device 10 comprises a light emitter 11, four light detectors 12, a memory component 13, a calculation component 14 and a signal transmitter 15.

The light emitter 11 is configured to emit IR light (i.e., of a wavelength or range of wavelengths that fall within the wavelength range of IR light or that overlap the wavelength range of IR light).

Each of the light detectors 12 is configured to detect IR light and quantify intensity of IR light received (i.e., to detect light of a wavelength or range of wavelengths that fall within the wavelength range of IR light or that overlap the wavelength range of IR light).

The dispenser control device 10 is shown in combination with a housing 16 in which is mounted a dispenser 17.

The light emitter 11 is aimed at a location in which a receptacle is intended to be placed (i.e., in a material-receiving location 18) in order for material to be dispensed from the dispenser 17 into the receptacle.

Each of the light detectors 12 is aimed at the receptacle but the axes of the respective light detectors are aligned differently. In the present embodiment, a first of the light detectors 12 is aimed generally toward a region that is occupied by a front portion of a receptacle when placed in the material-receiving location 18, a second of the light detectors 12 is aimed generally toward a region that is occupied by a rear portion of a receptacle when placed in the material-receiving location 18, a third of the light detectors 12 is aimed generally toward a region that is occupied by a left portion of a receptacle when placed in the material-receiving location 18, and a fourth of the light detectors 12 is aimed generally toward a region that is occupied by a right portion of a receptacle when placed in the material-receiving location 18.

The dispenser control device is configured to conduct a sequence of activities comprising (1) calibration, (2) receptacle-type conjecturing after said calibration, (3) stopping-intensity value determination after said receptacle-type conjecturing, (4) receptacle filling status assessment after said stopping-intensity value determination, and (5) dispensing-termination signal transmission after receptacle filling status assessment, as those activities are described herein.

In a first embodiment of a representative method in accordance with the present inventive subject matter (and/or a method that can readily be performed by a representative dispenser control device in accordance with the present inventive subject matter), a receptacle is placed in a material-receiving location, and then the dispenser control device is prompted to begin a filling process (e.g., by the dispenser control device sensing that a receptacle has been placed in the material-receiving location, by a fill request button 19 being pressed, and/or by any other suitable activity). The filling process comprises (1) calibration, (2) receptacle-type conjecturing after said calibration, (3) stopping-intensity value determination after said receptacle-type conjecturing, (4) receptacle filling status assessment after said stopping-intensity value determination, and (5) dispensing-termination signal transmission after receptacle filling status assessment. The first embodiment of a representative method will be described with reference to the dispenser control device 10 depicted in FIG. 1.

In the calibration, a calibration sequence is conducted, the calibration sequence comprising setting a light pulse quantity at an initial light pulse quantity (e.g., 16 pulses), and a quantity of calibration light pulses equal to the initial light pulse quantity (i.e., 16) is emitted from the light emitter 11, each pulse of a first light emission intensity and lasting 4, 8 or 16 microseconds, with a short gap (e.g., 2, 4, 8 or 16 microseconds) between each pulse. Each light detector 12 detects an intensity of reflected light of each light pulse in the calibration series of light pulses, and provides a readout signal indicative of the detected intensity (e.g., a quantity between 0 and 255), and the respective readout signals for each light detector 12 (i.e., in response to the 16 pulses) are summed to determine an aggregate calibration reflected light intensity value for each light detector. The respective aggregate calibration reflected light intensity values for the light detectors 12 are compared with a maximum calibration aggregate reflected light intensity value (e.g., 255). If the aggregate calibration reflected light intensity value for each light detector is less than the maximum calibration aggregate reflected IR intensity value (e.g., each is less than 255), the light pulse quantity is increased by a light pulse calibration increase value (e.g., the light pulse quantity is increased by one), and the calibration sequence is repeated until either (1) the aggregate calibration reflected light intensity value for at least one light detector 12 equals or exceeds the maximum calibration aggregate reflected light intensity value, or (2) a maximum quantity for the light pulse quantity is reached and the aggregate calibration reflected light intensity value for each light detector remains less than the maximum calibration aggregate reflected IR intensity value. If (1) the aggregate calibration reflected light intensity value for at least one light detector 12 equals or exceeds the maximum calibration aggregate reflected light intensity value, the light pulse quantity is decreased by a light pulse calibration decrease value (e.g., one pulse) to arrive at a calibrated light pulse quantity, and the method proceeds to receptacle-type conjecturing, discussed below. If (2) a maximum quantity for the light pulse quantity is reached and the aggregate calibration reflected light intensity value for each light detector remains less than the maximum calibration aggregate reflected IR intensity value, the method switches over to visible light emission and detection, and the method follows a visible light sequence, discussed below. By performing such calibration, there is a reduced chance for any of the detectors to saturate (i.e., to read their maximum value at different intensities, making it impossible to discern differences between such intensities), while also increasing or maximizing that available range of intensity readings (i.e., the highest intensities can generate values close to, but not exceeding, the maximum detection values).

In the receptacle-type conjecturing, dispensing of material from the dispenser 17 into a receptacle is initiated, and then, after passage of a first reading delay period of time (e.g., one second, three seconds, or five seconds), a reflected light detection activity is carried out, the reflected light detection activity comprising emitting from the light emitter 11 a quantity of light pulses equal to the calibrated light pulse quantity (each of the first series of light pulses substantially of the first light emission intensity); each light detector detecting an intensity of reflected light of each light pulse in the first series of light pulses; for each light detector, the respective intensities of reflected light of the light pulses in the first series of light pulses are summed to determine a first aggregate reflected light intensity value; and the respective first aggregate reflected light intensity values are summed to determine a first combined reflected intensity value. The reflected light detection activity is repeated, e.g., every few milliseconds. After a period of time (a receptacle-type conjecturing interval), a second combined reflected intensity value is determined (i.e., the combined reflected intensity value that is determined by the repeating light detection activity nearest to the passage of the receptacle-type conjecturing interval, and the calculation component determines a combined reflected light slope of change, the combined reflected light slope of change equal to (the second combined reflected light intensity value minus the first combined reflected light intensity value) divided by the length of time of the receptacle-type conjecturing interval (e.g., if upon the passage of a first reading delay period of time, the aggregate reflected light intensity value for each of the light detectors is 250, such that the first combined reflected intensity value is 1,000, and 10 seconds thereafter (the receptacle-type conjecturing interval being 10 seconds), the aggregate reflected light intensity for each of the light detectors is 225, such that the second combined reflected intensity value is 900, the combined reflected light slope of change would be −10, i.e., (900-1,000) divided by 10). Then, the calculation component compares the combined reflected light slope of change with stored (e.g., empirically determined) slope of reflected light change values for respective receptacle types stored in the memory component. Then, the calculation component selects a conjectured receptacle type, from among receptacle types stored in the memory component, that has a stored slope of reflected light change value that is closest to the combined reflected light slope of change (i.e., a receptacle type that has a stored slope of reflected light change value that is closest to −10), and the method moves to stopping-intensity value determination.

In the stopping-intensity value determination, the calculation component determines a light reflection intensity value at which dispensing should be terminated, the light reflection intensity value at which dispensing should be terminated equal to the first combined reflected light intensity value divided by a receptacle constant, the receptacle constant equal to a stored value for the conjectured receptacle type, and the method moves to receptacle-filling status assessment (e.g., if the stored value for the receptacle type that has a stored slope of reflected light change value that is closest to −10 is 2.5, the light reflection intensity value at which dispensing should be terminated will be calculated to be 400 (i.e., 1,000 divided by 2.5), i.e., 100 for each light detector).

In the receptacle filling status assessment, the calculation component repeats a combined light intensity value comparison sequence in which:
   a quantity (the calibrated light pulse quantity) of status-assessment light pulses is emitted from the first light emitter, each of said status-assessment light pulses substantially of the first light emission intensity;
   each light detector detects an intensity of reflected light of each light pulse in the status-assessment series of light pulses;
   for each light detector, the respective intensities of reflected light of each light pulse in the status-assessment light pulses are summed to determine a status-assessment aggregate reflected light intensity value;
   the respective status-assessment aggregate reflected light intensity values of the light detectors are summed to determine a status-assessment combined reflected light intensity value,
   the status-assessment combined reflected light intensity value is compared with the light reflection intensity value at which dispensing should be terminated; and then:
      if the status-assessment combined reflected light intensity value is greater than the light reflection intensity value at which dispensing should be terminated (in this instance, if it is greater than 400), a status-assessment interval is allowed to pass before repeating the receptacle filling status assessment activities,
      if the status-assessment combined reflected light intensity value is less than or equal to the light reflection intensity value at which dispensing should be terminated (in this instance, if it is 400 or less), the dispensing of material into the receptacle is terminated (e.g., by the signal transmitter 15 transmitting a dispensing-termination signal instructing the dispenser 17 to terminate dispensing).

FIG. 2 schematically depicts a second representative embodiment of a dispenser control device 20 in accordance with the present inventive subject matter. The dispenser control device 20 comprises four visible light emitters, namely, a red light emitter 21a, a green light emitter 21b, a blue light emitter 21c and a white light emitter 21d, an IR light emitter 21e, four IR light detectors 22a, four visible light detectors, i.e., a red light detector 22b, a green light detector 22c, a blue light detector 22d and a white light detector 22e, a memory component 23, a calculation component 24, a housing 26, a spout (dispenser) 27 and a button 29 (i.e., a fill request button).

A visible light sequence (mentioned above, e.g., initiated upon a maximum quantity for the light pulse quantity being reached (during calibration) and the aggregate calibration reflected light intensity value for each light detector remaining less than the maximum calibration aggregate reflected IR intensity value, is generally analogous to the activities described above in relation to IR light, except that while the combined reflected light slope of change when using IR light (such slope being compared with stored slope of reflected light change values for respective receptacle types) is typically negative, when visible light is used, whereas for visible light, the combined reflected light slope of change tends to be constant initially and later decrease (e.g., when the receptacle is partially filled). Accordingly, when using visible light, if the detected slope of reflected light change value is not decreasing, that detected slope of reflected light change value is used; on the other hand, if the detected slope of reflected light change value is decreasing (e.g., becoming more negative), the detected slope of reflected light change value corresponding to a receptacle type having the smallest receptacle constant is used, to avoid overfilling, and detected slope of reflected light change values are continued to be determined as material is dispensed into the receptacle (and if a detected slope of reflected light change value corresponding to a receptacle type having a smaller receptacle constant is detected, that detected slope of reflected light change value, and the corresponding smaller receptacle constant, is used (again, to avoid overfilling).

The invention claimed is:

1. A dispenser control device, comprising:
at least a first light emitter and at least a first light detector;
a memory component;
a calculation component; and
a signal transmitter,
the dispenser control device configured to conduct a sequence of activities comprising (1) calibration, (2) receptacle-type conjecturing after said calibration, (3) stopping-intensity value determination after said receptacle-type conjecturing, (4) receptacle filling status assessment after said stopping-intensity value determination, and (5) dispensing-termination signal transmission after said receptacle filling status assessment,
said calibration comprising:
  (a) setting a light pulse quantity at an initial light pulse quantity; then
  (b) repeating a calibration sequence comprising:
    (i) emitting from the first light emitter a calibration series of light pulses, each of said calibration series of light pulses substantially of a first light emission intensity, the calibration series of light pulses consisting of a quantity of light pulses equal to the light pulse quantity;
    (ii) each light detector detecting an intensity of reflected light of each light pulse in the calibration series of light pulses;
    (iii) for each light detector, summing the respective intensities of reflected light of the light pulses in the calibration series of light pulses to determine an aggregate calibration reflected light intensity value for the light detector;
    (iv) comparing the aggregate calibration reflected light intensity value for each light detector with a maximum calibration aggregate reflected light intensity value; and then
    (v) if the aggregate calibration reflected light intensity value for each light detector is less than the maximum calibration aggregate reflected IR intensity value, increasing the light pulse quantity by a light pulse calibration increase value,
    until the aggregate calibration reflected light intensity value for at least one light detector equals or exceeds the maximum calibration aggregate reflected light intensity value; and then
  (c) decreasing the light pulse quantity by a light pulse calibration decrease value to arrive at a calibrated light pulse quantity;
said receptacle-type conjecturing comprising:
  while material is being dispensed from a dispenser into a receptacle:
    emitting from the first light emitter a first series of light pulses, each of said first series of light pulses substantially of the first light emission intensity, the first series of light pulses consisting of a quantity of light pulses equal to the calibrated light pulse quantity;
    each light detector detecting an intensity of reflected light of each light pulse in the first series of light pulses;
    for each light detector, summing the respective intensities of reflected light of the light pulses in the first series of light pulses to determine a first aggregate reflected light intensity value;
    summing the respective first aggregate reflected light intensity values to determine a first combined reflected intensity value; then
    waiting a period of time equal to a receptacle-type conjecturing interval; then
    emitting from the first light emitter a second series of light pulses, each of said second series of light pulses substantially of the first light emission intensity, the second series of light pulses consisting of a quantity of light pulses equal to the calibrated light pulse quantity;
    each light detector detecting an intensity of reflected light of each light pulse in the second series of light pulses;
    for each light detector, summing the respective intensities of reflected light of the light pulses in the second series of light pulses to determine a second aggregate reflected light intensity value;
    summing the respective second aggregate reflected light intensity values to determine a second combined reflected intensity value; then
  the calculation component determining a combined reflected light slope of change, the combined reflected light slope of change equal to:
    (the second combined reflected light intensity value minus the first combined reflected light intensity value) divided by the length of time between the first series of light pulses and the second series of light pulses; then
  the calculation component comparing the combined reflected light slope of change with stored slope of reflected light change values for respective receptacle types stored in the memory component; and then
  the calculation component selecting a conjectured receptacle type, from among receptacle types stored in the memory component, that has a stored slope of reflected light change value that is closest to the combined reflected light slope of change,
said stopping-intensity value determination comprising the calculation component determining a light reflection intensity value at which dispensing should be terminated, said light reflection intensity value at which dispensing should be terminated equal to:
  the first combined reflected light intensity value divided by a receptacle constant, the receptacle constant equal to a stored value for the conjectured receptacle type,
said receptacle filling status assessment comprising:
  the calculation component repeating a combined light intensity value comparison sequence comprising:
    emitting from the first light emitter a status-assessment series of light pulses, each of said status-assessment series of light pulses substantially of the first light emission intensity, the status-assessment series of light pulses consisting of a quantity of light pulses equal to the calibrated light pulse quantity;

each light detector detecting an intensity of reflected light of each light pulse in the status-assessment series of light pulses;

for each light detector, summing the respective intensities of reflected light of each light pulse in the status-assessment series of light pulses to determine a status-assessment aggregate reflected light intensity value;

summing the respective status-assessment aggregate reflected light intensity values to determine a status-assessment combined reflected light intensity value, comparing the status-assessment combined reflected light intensity value with said light reflection intensity value at which dispensing should be terminated; and then if the status-assessment combined reflected light intensity value is greater than said light reflection intensity value at which dispensing should be terminated, waiting a status-assessment interval, until the status-assessment combined reflected light intensity value is less than or equal to said light reflection intensity value at which dispensing should be terminated;

said dispensing-termination signal transmission comprising:

upon the calculation component determining that the status-assessment combined reflected light intensity value is less than or equal to said light reflection intensity value at which dispensing should be terminated, the signal transmitter transmitting a dispensing-termination signal, the dispensing-termination signal instructing a dispenser to terminate dispensing.

2. A dispenser control device as recited in claim 1, wherein the first light emitter emits the first series of light pulses a first reading delay period of time after initiation of said material being dispensed from the dispenser into the receptacle.

3. A dispenser control device as recited in claim 1, wherein the sequence of activities is initiated automatically upon the dispenser control device sensing that a receptacle is located in a material-receiving location.

4. A dispenser control device as recited in claim 1, wherein the sequence of activities is initiated automatically upon a dispensing request being generated.

5. A dispenser control device as recited in claim 1, wherein the first light emitter and the first light detector are separate components.

6. A dispenser control device as recited in claim 1, wherein a first light component comprises the first light emitter and the first light detector.

7. A dispenser control device as recited in claim 1, wherein:
the first light emitter is an IR light emitter; and
each of the at least a first light detector is an IR light detector.

8. A dispenser control device as recited in claim 1, wherein the dispenser control device comprises a plurality of light detectors, including the first light detector.

9. A dispenser control device as recited in claim 1, wherein the first light detector is the only light detector in the dispenser control device.

10. A dispenser control device, comprising:
at least a first light emitter;
a plurality of light detectors;
a memory component;
a calculation component; and
a signal transmitter,
the dispenser control device configured to conduct a sequence of activities comprising (1) calibration, (2) receptacle-type conjecturing after said calibration, (3) stopping-intensity value determination after said receptacle-type conjecturing, (4) receptacle filling status assessment after said stopping-intensity value determination, and (5) dispensing-termination signal transmission after receptacle filling status assessment,
said calibration comprising:
(a) setting a light pulse quantity at an initial light pulse quantity; then
(b) repeating a calibration sequence comprising:
(i) emitting from the first light emitter a calibration series of light pulses, each of said calibration series of light pulses substantially of a first light emission intensity, the calibration series of light pulses consisting of a quantity of light pulses equal to the light pulse quantity;
(ii) each light detector detecting an intensity of reflected light of each light pulse in the calibration series of light pulses;
(iii) for each light detector, summing the respective intensities of reflected light of the light pulses in the calibration series of light pulses to determine an aggregate calibration reflected light intensity value for the light detector;
(iv) comparing the aggregate calibration reflected light intensity value for each light detector with a maximum calibration aggregate reflected light intensity value; and then
(v) if the aggregate calibration reflected light intensity value for each light detector is less than the maximum calibration aggregate reflected IR intensity value, increasing the light pulse quantity by a light pulse calibration increase value,
until the aggregate calibration reflected light intensity value for at least one light detector equals or exceeds the maximum calibration aggregate reflected light intensity value; and then
(c) decreasing the light pulse quantity by a light pulse calibration decrease value to arrive at a calibrated light pulse quantity;
said receptacle-type conjecturing comprising:
while material is being dispensed from a dispenser into a receptacle:
emitting from the first light emitter a first series of light pulses, each of said first series of light pulses substantially of the first light emission intensity, the first series of light pulses consisting of a quantity of light pulses equal to the calibrated light pulse quantity;
each light detector detecting an intensity of reflected light of each light pulse in the first series of light pulses;
for each light detector, summing the respective intensities of reflected light of the light pulses in the first series of light pulses to determine a first aggregate reflected light intensity value;
summing the respective first aggregate reflected light intensity values to determine a first combined reflected intensity value; then waiting a period of time equal to a receptacle-type conjecturing interval; then emitting from the first light emitter a second series of light pulses, each of said second series of light pulses substantially of the first light emission intensity, the second series of light pulses consisting of a quantity of light pulses equal to the calibrated light pulse quantity;

each light detector detecting an intensity of reflected light of each light pulse in the second series of light pulses;

for each light detector, summing the respective intensities of reflected light of the light pulses in the second series of light pulses to determine a second aggregate reflected light intensity value;

summing the respective second aggregate reflected light intensity values to determine a second combined reflected intensity value; then the calculation component determining a combined reflected light slope of change, the combined reflected light slope of change equal to:
(the second combined reflected light intensity value minus the first combined reflected light intensity value) divided by the length of time between the first series of light pulses and the second series of light pulses; then the calculation component comparing the combined reflected light slope of change with stored slope of reflected light change values for respective receptacle types stored in the memory component; and then the calculation component selecting a conjectured receptacle type, from among receptacle types stored in the memory component, that has a stored slope of reflected light change value that is closest to the combined reflected light slope of change, said stopping-intensity value determination comprising the calculation component determining a light reflection intensity value at which dispensing should be terminated, said light reflection intensity value at which dispensing should be terminated equal to:

the first combined reflected light intensity value divided by a receptacle constant, the receptacle constant equal to a stored value for the conjectured receptacle type, said receptacle filling status assessment comprising:
the calculation component repeating a combined light intensity value comparison sequence comprising:
emitting from the first light emitter a status-assessment series of light pulses, each of said status-assessment series of light pulses substantially of the first light emission intensity, the status-assessment series of light pulses consisting of a quantity of light pulses equal to the calibrated light pulse quantity;

each light detector detecting an intensity of reflected light of each light pulse in the status-assessment series of light pulses;

for each light detector, summing the respective intensities of reflected light of each light pulse in the status-assessment series of light pulses to determine a status-assessment aggregate reflected light intensity value;

summing the respective status-assessment aggregate reflected light intensity values to determine a status-assessment combined reflected light intensity value, comparing the status-assessment combined reflected light intensity value with said light reflection intensity value at which dispensing should be terminated; and then if the status-assessment combined reflected light intensity value is greater than said light reflection intensity value at which dispensing should be terminated, waiting a status-assessment interval, until the status-assessment combined reflected light intensity value is less than or equal to said light reflection intensity value at which dispensing should be terminated;

said dispensing-termination signal transmission comprising:
upon the calculation component determining that the status-assessment combined reflected light intensity value is less than or equal to said light reflection intensity value at which dispensing should be terminated, the signal transmitter transmitting a dispensing-termination signal, the dispensing-termination signal instructing a dispenser to terminate dispensing.

11. A dispenser control device as recited in claim 10, wherein the first light emitter emits the first series of light pulses substantially a first reading delay period of time after initiation of said material being dispensed from the dispenser into the receptacle.

12. A dispenser control device as recited in claim 10, wherein the sequence of activities is initiated automatically upon the dispenser control device sensing that a receptacle is located in a material-receiving location.

13. A dispenser control device as recited in claim 10, wherein the sequence of activities is initiated automatically upon a dispensing request being generated.

14. A dispenser control device as recited in claim 10, wherein the first light emitter and the first light detector are a single component.

15. A dispenser control device as recited in claim 10, wherein:
the first light emitter is an IR light emitter; and
each of the plurality of light detectors is an IR light detector.

16. A method, comprising:
conducting a sequence of activities comprising (1) calibration, (2) receptacle-type conjecturing after said calibration, (3) stopping-intensity value determination after said receptacle-type conjecturing, (4) receptacle filling status assessment after said stopping-intensity value determination, and (5) dispensing-termination signal transmission after said receptacle filling status assessment, said calibration comprising:
(a) setting a light pulse quantity at an initial light pulse quantity; then
(b) repeating a calibration sequence comprising:
(i) emitting from a first light emitter a calibration series of light pulses, each of said calibration series of light pulses substantially of a first light emission intensity, the calibration series of light pulses consisting of a quantity of light pulses equal to the initial light pulse quantity;
(ii) each of at least a first light detector detecting an intensity of reflected light of each light pulse in the calibration series of light pulses;
(iii) for each light detector, summing the respective intensities of reflected light of the light pulses in the calibration series of light pulses to determine an aggregate calibration reflected light intensity value for the light detector;
(iv) comparing the aggregate calibration reflected light intensity value for each light detector with a maximum calibration aggregate reflected light intensity value; and then
(v) if the aggregate calibration reflected light intensity value for each light detector is less than the maximum calibration aggregate reflected IR intensity value, increasing the light pulse quantity by a light pulse calibration increase value,
until the aggregate calibration reflected light intensity value for at least one light detector equals or exceeds the maximum calibration aggregate reflected light intensity value; and then
(c) decreasing the light pulse quantity by a light pulse calibration decrease value to arrive at a calibrated light pulse quantity;
said receptacle-type conjecturing comprising:
while material is being dispensed from a dispenser into a receptacle:
emitting from the first light emitter a first series of light pulses, each of said first series of light pulses substantially of the first light emission intensity, the first series of light pulses consisting of a quantity of light pulses equal to the calibrated light pulse quantity;
each light detector detecting an intensity of reflected light of each light pulse in the first series of light pulses;
for each light detector, summing the respective intensities of reflected light of the light pulses in the first series of light pulses to determine a first aggregate reflected light intensity value;
summing the respective first aggregate reflected light intensity values to determine a first combined reflected intensity value; then
waiting a period of time equal to a receptacle-type conjecturing interval; then
emitting from the first light emitter a second series of light pulses, each of said second series of light pulses substantially of the first light emission intensity, the second series of light pulses consisting of a quantity of light pulses equal to the calibrated light pulse quantity;
each light detector detecting an intensity of reflected light of each light pulse in the second series of light pulses;
for each light detector, summing the respective intensities of reflected light of the light pulses in the second series of light pulses to determine a second aggregate reflected light intensity value;
summing the respective second aggregate reflected light intensity values to determine a second combined reflected intensity value; then
a calculation component determining a combined reflected light slope of change, the combined reflected light slope of change equal to:
(the second combined reflected light intensity value minus the first combined reflected light intensity value) divided by the length of time between the first series of light pulses and the second series of light pulses; then
the calculation component comparing the combined reflected light slope of change with stored slope of reflected light change values for respective receptacle types stored in a memory component; and then
the calculation component selecting a conjectured receptacle type, from among receptacle types stored in the memory component, that has a stored slope of reflected light change value that is closest to the combined reflected light slope of change,
said stopping-intensity value determination comprising the calculation component determining a light reflection intensity value at which dispensing should be terminated, said light reflection intensity value at which dispensing should be terminated equal to:
the first combined reflected light intensity value divided by a receptacle constant, the receptacle constant equal to a stored value for the conjectured receptacle type,
said receptacle filling status assessment comprising:
the calculation component repeating a combined light intensity value comparison sequence comprising:
emitting from the first light emitter a status-assessment series of light pulses, each of said status-assessment series of light pulses substantially of the first light emission intensity, the status-assessment series of light pulses consisting of a quantity of light pulses equal to the calibrated light pulse quantity;
each light detector detecting an intensity of reflected light of each light pulse in the status-assessment series of light pulses;
for each light detector, summing the respective intensities of reflected light of each light pulse in the status-assessment series of light pulses to determine a status-assessment aggregate reflected light intensity value;
summing the respective status-assessment aggregate reflected light intensity values to determine a status-assessment combined reflected light intensity value,
comparing the status-assessment combined reflected light intensity value with said light reflection intensity value at which dispensing should be terminated; and then
if the status-assessment combined reflected light intensity value is greater than said light reflection intensity value at which dispensing should be terminated, waiting a status-assessment interval,
until the status-assessment combined reflected light intensity value is less than or equal to said light reflection intensity value at which dispensing should be terminated;
said dispensing-termination signal transmission comprising:
upon the calculation component determining that the status-assessment combined reflected light intensity value is less than or equal to said light reflection intensity value at which dispensing should be terminated, the signal transmitter transmitting a dispensing-termination signal, the dispensing-termination signal instructing a dispenser to terminate dispensing.

17. A method as recited in claim 16, wherein the first light emitter emits the first series of light pulses a first reading delay period of time after initiation of said material being dispensed from the dispenser into the receptacle.

18. A method as recited in claim 16, wherein:
the first light emitter and the first light detector are each part of a dispenser control device; and the sequence of activities is initiated automatically upon the dispenser control device sensing that a receptacle is located in a material-receiving location.

19. A method as recited in claim 16, wherein the sequence of activities is initiated automatically upon a dispensing request being generated.

20. A method as recited in claim 16, wherein the first light emitter and the first light detector are separate components.

21. A method as recited in claim 16, wherein a first light component comprises the first light emitter and the first light detector.

22. A method as recited in claim 16, wherein:
the first light emitter is an IR light emitter; and
each of the at least a first light detector is an IR light detector.

23. A method as recited in claim 16, wherein:
the first light emitter and the first light detector are each part of a dispenser control device; and
the first light detector is the only light detector in the dispenser control device.

24. A method as recited in claim 16, wherein:
the first light emitter and the first light detector are each part of a dispenser control device; and
the dispenser control device comprises a plurality of light emitters, including the first light emitter.

25. A method as recited in claim 16, wherein:
the first light emitter and the first light detector are each part of a dispenser control device; and
the dispenser control device comprises a plurality of light detectors, including the first light detector.

26. A method as recited in claim 25, wherein the first light emitter emits the first series of light pulses substantially a first reading delay period of time after initiation of said material being dispensed from the dispenser into the receptacle.

27. A method as recited in claim 25, wherein the sequence of activities is initiated automatically upon the dispenser control device sensing that a receptacle is located in a material-receiving location.

28. A method as recited in claim 25, wherein the sequence of activities is initiated automatically upon a dispensing request being generated.

29. A method as recited in claim 25, wherein a single component comprises the first light emitter and the first light detector.

30. A method as recited in claim 25, wherein:
the first light emitter is an IR light emitter; and
each of the plurality of light detectors is an IR light detector.

* * * * *